(12) United States Patent
Kassow et al.

(10) Patent No.: US 8,779,715 B2
(45) Date of Patent: Jul. 15, 2014

(54) PROGRAMMABLE ROBOT AND USER INTERFACE

(75) Inventors: Kristian Kassow, Odense C. (DK); Esben Hallundbæk Østergaard, Odense C. (DK); Kasper Støy, Odense C. (DK)

(73) Assignee: Universal Robots ApS, Hjallelse, Odense S. (DK)

( * ) Notice: Subject to any disclaimer, the term of this patent is extended or adjusted under 35 U.S.C. 154(b) by 1008 days.

(21) Appl. No.: 12/281,528

(22) PCT Filed: Mar. 2, 2007

(86) PCT No.: PCT/IB2007/050683
§ 371 (c)(1),
(2), (4) Date: Feb. 23, 2009

(87) PCT Pub. No.: WO2007/099511
PCT Pub. Date: Sep. 7, 2007

(65) Prior Publication Data
US 2009/0289591 A1  Nov. 26, 2009

(30) Foreign Application Priority Data
Mar. 3, 2006  (DK) ................... 2006 00308

(51) Int. Cl.
*G05B 19/04* (2006.01)

(52) U.S. Cl.
USPC ............. 318/568.2; 318/568.1; 318/568.11; 318/568.12; 318/568.13; 318/568.21; 318/568.23; 700/245; 700/248; 700/253

(58) Field of Classification Search
USPC ............ 318/567, 568.11, 568.12, 568.13, 318/568.16, 568.2, 568.21, 568.25, 560, 318/568.1, 568.17, 568.23, 585, 586, 592; 700/245, 264, 248, 253; 701/2; 702/2; 345/633
See application file for complete search history.

(56) References Cited

U.S. PATENT DOCUMENTS

| | | | |
|---|---|---|---|
| 4,398,110 A | 8/1983 | Flinchbaugh et al. | |
| 4,678,952 A | 7/1987 | Peterson et al. | |
| 5,103,941 A | 4/1992 | Vranish | |
| 5,495,410 A | 2/1996 | Graf | |
| 5,880,956 A * | 3/1999 | Graf | 700/86 |
| 6,292,715 B1 | 9/2001 | Rongo | |
| 6,408,224 B1 | 6/2002 | Okamoto et al. | |
| 6,837,892 B2 * | 1/2005 | Shoham | 606/130 |
| 6,996,456 B2 * | 2/2006 | Cordell et al. | 700/258 |
| 7,272,524 B2 | 9/2007 | Brogårdh | |

(Continued)

FOREIGN PATENT DOCUMENTS

| | | |
|---|---|---|
| EP | 1724676 | 11/2006 |
| JP | 2004316722 | 11/2004 |

*Primary Examiner* — Antony M Paul
(74) *Attorney, Agent, or Firm* — Douglas E. Jackson; Stites & Harbison PLLC

(57) ABSTRACT

A programmable robot system includes a robot provided with a number of individual arm sections, where adjacent sections are interconnected by a joint. The system furthermore includes a controllable drive mechanism provided in at least some of the joints and a control system for controlling the drive mechanism. The robot system is furthermore provided with user a interface mechanism including a mechanism for programming the robot system, the user interface mechanism being either provided externally to the robot, as an integral part of the robot or as a combination hereof, and a storage mechanism co-operating with the user interface mechanism and the control system for storing information related to the movement and further operations of the robot and optionally for storing information relating to the surroundings.

16 Claims, 30 Drawing Sheets

(56) References Cited

U.S. PATENT DOCUMENTS

| | | | |
|---|---|---|---|
| 7,298,385 B2* | 11/2007 | Kazi et al. | 345/633 |
| 7,643,907 B2* | 1/2010 | Fuhlbrigge et al. | 700/264 |
| 8,050,797 B2* | 11/2011 | Lapham | 700/245 |
| 8,160,205 B2* | 4/2012 | Saracen et al. | 378/69 |
| 2003/0120391 A1 | 6/2003 | Saito | |
| 2004/0189631 A1* | 9/2004 | Kazi et al. | 345/418 |
| 2004/0212626 A1* | 10/2004 | Lyxzen et al. | 345/589 |
| 2005/0267637 A1* | 12/2005 | Lapham | 700/245 |
| 2006/0125806 A1* | 6/2006 | Voyles et al. | 345/184 |
| 2006/0178775 A1* | 8/2006 | Zhang et al. | 700/245 |

* cited by examiner

PROGRAMMABLE ROBOT AND USER INTERFACE

TECHNICAL FIELD

The invention relates generally to programmable robot systems and robots and more specifically to user interface means for such robots, joints for such robots, methods for programming of such robots and databases for storing information relating to the programming and operations of the robot system.

BACKGROUND OF THE INVENTION

Programmable robots for use in industry are generally known. A traditional method of programming such robots consists of initially guiding the robot, for instance the tool or end effector on the robot arm from an initial point in space, for instance a pick-up location through a desired path in space leading to a final destination of the end effector, where an object initially picked up may be delivered. The robot or external control means are provided with storage means for storing information relating to the above movement from an initial to a final position. After this learning session the robot is able to repeat the procedure and carry out the task to be performed. In stead of moving the end effector of the robot through the desired path as described above a dedicated tracking device for tracking the desired path in space may also be employed, an example of such a system being for instance shown in U.S. Pat. No. 5,495,410.

Generally, the programming of robots used in industry requires specialised knowledge and can only be performed by persons skilled in the art, often referred to as system integrators. In connection with multi-purpose robots for use in industry or even at home, it would be advantageous to have access to a robot with user interface means facilitating quick and simple programming of the robot, including re-programming from one task to another which can be performed by any person, not only a person with special skills within this art.

It would furthermore be advantageous to have access to a programmable robot provided with simple means for avoiding hazards to the surroundings such as collisions with surrounding equipment, boundaries or persons.

It would furthermore be advantageous to have access to a programmable robot provided with means for storing a number of working scenarios, i.e. information on the specific working procedures, initial and final positions of the end effector and trajectories in space of the end effector or other portions of the robot, characteristics of objects to be approached and handled by the robot and information on the surroundings limiting the allowable trajectories of portions of the robot, i.e. a description of the relevant characteristics, boundaries, objects, etc. in the surroundings.

SUMMARY OF THE INVENTION

The above and other objects are according to the present invention attained by a programmable robot system, a control system for such a robot and user interface means for such a robot. The invention furthermore relates to a method for programming the robot using such interface means. The invention furthermore relates to a database for storing information relating to programming and operation of a robot and to a joint for use in a robot.

It is specifically an object of the present invention to provide a programmable robot system which can be programmed in a simple and easy manner without this requiring specialised knowledge, i.e. which can be performed for instance by an operator or technician in industry or even by a private person for instance at home.

It is a further object of the invention to provide a programmable robot system which can easily be re-programmed to perform different operations and thereby be used for performing different operations part-time in for instance an industrial setting, thus avoiding the necessity of using a number of dedicated robots which may only be required to operate less than full time.

It is a further object of the present invention to provide a method for programming a robot.

It is a further object of the present invention to provide a user interface, which facilitates quick and straightforward programming of a robot.

These and further objects are according to the invention attained by a robot system comprising
  (a) a robot comprising a number of individual arm sections, where adjacent sections are joined by a joint;
  (b) controllable drive means provided in at least some of said joints;
  (c) a control system for controlling said drive means,
  (d) user interface means either provided externally to the robot, as an integral part of the robot or as a combination hereof;
  (e) storage means for storing information related to the movement and further operations of the robot and optionally for storing information relating to the surroundings.

According to a specific embodiment of the invention, the robot can be provided with sensor means for sensing the position of various portions (for instance the joints and/or the end effector) of the robot relative to the surroundings.

According to a specific embodiment of the invention said sensor means comprise one or more cameras, which can for instance be provided in the vicinity of the end effector and which can for instance be applied to identify and recognise objects to be handled by the robot or other relevant objects, boundaries etc. in the surroundings.

The invention furthermore relates to a robot comprising:
  (a) a robot comprising a number of individual arm sections, where adjacent sections are interconnected by a joint;
  (b) controllable drive means provided in at least some of said joints;
  (c) a control system for controlling said drive means;
  (d) attachment and drive means for a tool;

A very important aspect of the present invention relates to the user interface. The user interface does thus not primarily address the person skilled in the art of setting up and programming industrial robots but rather anybody employed in an industrial setting or even at home who quickly and yet reliably needs to apply a robot to a specific task or to change the application of a robot from one task to another. According to a specific embodiment of the invention, the robot can be programmed and controlled from a standard personal computer running for instance a Windows program. An example of the programming of a robot according to the invention is given in the detailed description of the invention. Such programming and control may of course also be performed from a dedicated programming/control unit provided with a suitable man/machine interface comprising for instance a computer mouse and/or touch screen or other display screen and/or a keyboard. The PC or programming/control unit may also comprise the storage means described above.

The user interface according to the invention may alternatively be distributed between an external user-accessible control means provided at appropriate portions of the robot, for instance on the various joints. Thus for instance the joints could be provided with control buttons for moving each individual joint during the initial programming session for instance in order to avoid collisions with objects or boundaries in the surroundings. Such local control members on the appropriate parts of the robot could if desired be supplemented with sensor means for sensing the proximity of for instance the joints or the end effector to objects or boundaries when the robot is actually working. Thus if one or more of said objects or boundaries during a working session of the robot change their positions in space within certain limits, the robot will at least to some extent be able to sense such changes and apply appropriate measures to counteract detrimental effects of such changes.

By application of the user interface means of the invention, the relevant objects and boundaries in the surroundings may be located using the robot itself, for instance by moving the end effector—or for that matter any other part of the robot— to a number of points characterising the object or boundaries sufficiently. Thus for instance a planar boundary may be defined my moving the end effector to at least three points on the boundary and via the interface means specifying the corresponding space coordinates, whereby a plane boundary will be specified. A curved boundary of course requires a larger number of Cartesian coordinates to be specified, but under certain circumstances (for instance spherical or cylindrical objects or boundaries) other co-ordinate systems my be applied for specifying their extension in space.

According to a preferred embodiment of the invention, which will be described in detail in the detailed description of the invention, the user interface means comprises a display screen on which a picture of the robot and optionally also relevant portions of the surroundings is shown at least during the programming session of the robot. Thus, the robot could optionally be remotely programmed in cases where access to the work area for some reason is undesired or even impossible, for instance by initially specifying the position of the relevant objects and boundaries of the work. Sequences showing the movement of the robot and the relevant portions of the surroundings corresponding to a number of work areas and operations of the robot may be stored in the storage means and retrieved when the robot changes from one application to another. Thus, in fact a database comprising all relevant working scenarios of for instance an industrial plant may be gradually established, which greatly facilitates application of the robot for various purposes in an industrial setting or even at home.

It is understood that although the robot itself, its control system and the user interface used to program and/or control the robot in the present specification are described in terms of a single system, each of these entities could be used separately for instance in connection with other entities. Thus, also other controllable robots than the one described by the various embodiments hereof could be programmed and/or controlled using the control system and/or user interface means of the invention.

The present invention furthermore relates to a method for programming a robot according to the invention, a database for storing information relating to programming and operation of a robot and to a joint for use in a robot according to the invention. It is, however, understood that the method, database and joint according to the invention may also find application either together or separately in connection with other robots.

BRIEF DESCRIPTION OF THE DRAWINGS

The invention will be better understood with reference to the following detailed description of embodiments hereof in conjunction with the figures, where.

DETAILED DESCRIPTION OF THE INVENTION

Figure 1:
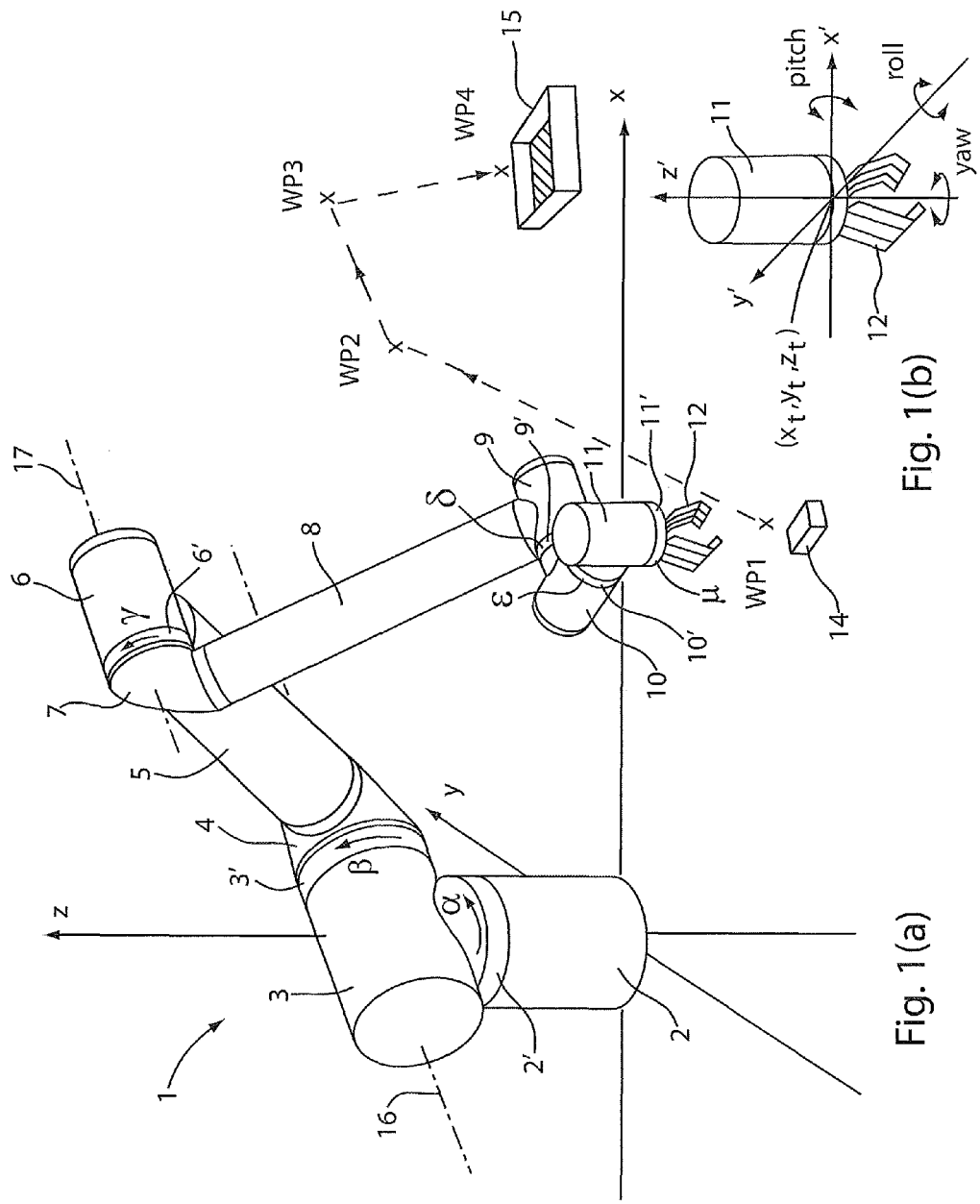
FIG. 1 shows a schematic perspective view of an embodiment of the robot according to the invention, set up to perform a simple pick-and-place operation, the view furthermore comprising definitions of Cartesian and spherical coordinates for characterising positions and orientations of various components of the robot.

As mentioned, the present invention relates to a programmable robot system, i.e. both to the robot itself, to the control system used for controlling the movements and functions of the robot including its end effector and storage means for storing pre-programmed movements and functions and relevant information about the objects to be handled by the robot and about the surrounding, in which the robot is working. The invention furthermore relates to a user interface used for communicating and controlling the robot at least during programming of the robot and furthermore for retrieving pre-programmed scenarios and patterns of movements etc. of the robot so that it can be used to perform different tasks for instance in an industrial setting without it being necessary to re-programme the robot for each new task.

In the following there are shown various embodiments of the robot itself and of the programming facilities (user interface) used to programme and control the robot but it is understood that a person skilled in the art may design modifications and variations to the embodiments actually shown without such modifications and variations falling outside the scope of the invention as defined by the appended claims.

According to an embodiment of the robot system according to the invention, the robot is at least able to perform the following operations (functionalities): (a) a pick-and-place operation, (b) a filling operation, and (c) a palletising operation. These operations or functionalities are implemented using a number of basic, primitive functionalities:

1) Specification of Position:
   Fixed position: The robot/the tool itself is either drawn or controlled from a user interface/control unit to the desired position and the approach vector is defined by the direction to the tool.
   Pallet: A plurality or an array of positions is specified as under "fixed position", but optionally corners, number of rows and columns or a pattern of positions could be specified.
   Time-controlled position: According to this option, a fixed position which an object is predicted to have reached a given interval of time after the activation of a trigger is determined.
   Distance-controlled position: According to this option, a fixed position which an object is predicted to have reached after moving a certain distance after the activation of a trigger is determined. This functionality requires that the velocity of the object be known (for instance the velocity of a conveyor upon which the object is placed).
   Variable time-controlled position: According to this option, an initial and a final position are determined by means of time-controlled position. The exact position of the object between these two positions can be determined on-line based on time.
   Variable distance-controlled position: According to this option, an initial and a final position are determined by means of distance-controlled position. The exact position of the object between these positions can be determined on-line if the velocity of the object is known.
2) Tracking:
   Time-controlled tracking: According to this option, an initial and final position is specified by means of time-controlled position. The object is tracked between these two positions based on time.
   Distance-controlled tracking: According to this option, an initial and a final position are specified by means of distance-controlled position. The object is tracked between these two positions based on the velocity of the object (for instance measured by the velocity of a conveyor upon which the object is placed).
3) Pattern of Movement:
   Intermediate positions or waypoints (of the tool) are defined by the above-mentioned methods and a path in space is adapted to these intermediate positions or waypoints.
   A sequence of positions (of the tool) is recorded and stored (dependent on the possibility of actually leading the robot (the tool mounted on the robot or an arm or joint of the robot) through a path in space without too much resistance from the robot).
4) Triggers:
   Distance-measuring means ("trip control") for instance on a conveyor belt.
   Time
   Sensor means, for instance light switch means, cameras, magnetic sensors, etc.
   Gripper sensor means.
5) Events/Actions:
   Tool approaching the object (via approach vector)
   Tool moves away from the object
   Activate the tool (gripper, sucking disc, paint pistol, etc.)
   De-activate the tool (gripper, sucking disc, paint pistol, etc.)

Typical sequences of actions performed by the robot during the above three basic operations will comprise:

A Typical Pick-and-Place Operation:

| | |
|---|---|
| (a) Pattern of movement: | Move to fixed initial position |
| (b) Trigger: | Light switch |
| (c) Pattern of movement: | Move to distance-controlled position |
| (d) Action: | Approach object |
| (e) Action: | Activate tool |
| (f) Action: | Move away from object |
| (g) Pattern of movement: | Through waypoints to fixed position |
| (h) Action: | De-activate tool |
| (i) Pattern of movement: | Through waypoints to fixed initial position |

A Typical Pattern of Movement Operation:

| | |
|---|---|
| (a) Pattern of movement: | Move to fixed initial position |
| (b) Trigger: | Light switch |
| (c) Pattern of movement: | Move to distance-controlled position |
| (d) Tracking: | Distance-controlled tracking |
| (e) Action: | Activate tool |
| (f) Trigger: | Time |
| (g) Action: | De-activate tool |
| (i) Pattern of movement: | Through waypoints to fixed initial position |

A Typical Loading Operation:

| | |
|---|---|
| (a) Pattern of movement: | Move to fixed initial position |
| (b) Trigger: | Light switch |
| (c) Pattern of movement: | Position sequence with timing |
| (d) Pattern of movement: | Through waypoints to fixed initial position |

The user interface according to the invention comprises wizards, i.e. simple sequences of screen images or menus by means of which the user can specify the standard operations to be performed by the robot. A wizard for the pick-and-place operation will comprise a sequence of screen images corresponding to the sequence of functions of primitive functionalities described above. Exemplary embodiments of such wizards will be described in the following.

Referring to FIG. 1, there is shown a schematic perspective view of an embodiment of the robot according to the invention, set up to perform a simple pick-and-place operation, the view furthermore comprising definitions of Cartesian and spherical coordinates for characterising positions and orientations of various components of the robot. Definitions of coordinates in relation to the base and joints of the robot are given in FIG. 1(a) and definitions of the position and orientation of the tool are given in FIG. 1(b).

In FIG. 1(a), the shown embodiment of a robot according to the invention is generally designated by reference numeral 1 and consists of a base 2, 2' which can be attached to a surrounding structure, which is not shown. The robot according to this embodiment of the invention basically consists of two arm sections 4, 5 and 7, 8 connected to the base 2, 2' and the wrist section 9, 9', 10, 10', 11, 11' carrying a tool 12, respectively, which as an example may consist of a gripper 12 schematically shown in FIGS. 1(a) and (b). Between the base 2 and the first arm section 5 are provided first interconnecting means comprising the sections 3 and 3'. The first interconnecting means are mounted for rotation about the longitudinal axis Z through the base 2, 2' as indicated by the angle α. This rotation is accomplished via a joint 2'. Similarly the first arm section 4, 5 is mounted for rotation about the longitudinal axis 16 through the interconnecting means 3, 3' as indicated by the angle β. The first arm section 4, 5 is coupled to the second arm section 7, 8 via second interconnecting means or joints 6, 6', about the longitudinal axis 17 of which the second arm section 7, 8 is mounted for rotation (angle γ). At the opposite end of the second arm, section 7, 8 is attached the wrist section 9, 9', 10, 10', 11, 11' carrying a tool 12. This section comprises three mutually perpendicular longitudinal axes 18, 19 and 20 through corresponding interconnecting means 9, 10 and 11. By the above interconnecting means (or joints), the tool may be brought to any position in space within the robot's maximal range of operation and the tool may furthermore be oriented (for instance tilted) in any direction in space required for the actual operational task of the tool.

For the six-joint embodiment described above, the orientation of each joint can be specified by the rotational angle about the corresponding axis of rotation, i.e. the angles α, β, γ, δ, ε, μ in the figure. Alternatively, the position (for instance the X, Y, Z co-ordinates of the tool: (Xt, Yt, Zt)) and the orientation of the tool for instance defined by the co-ordinates: roll, pitch, yaw can be specified. These co-ordinates are defined in FIG. 1(b). Specifically the co-ordinate roll denotes a rotation around the longitudinal axis y' of the tool, pitch denotes a rotation around the lateral axis x' through the tool and yaw denotes a rotation around the vertical axis z' through the tool. The control system can determine the required set of angular orientations (rotational angles α, β, γ, δ, ε, μ) of the joints from the position/orientation (X, Y, Z, roll, pitch, yaw) of the tool and vice versa.

Finally, FIG. 1(a) shows schematically the robot set-up for use in a pick-and-place operation, where an object 14 (for instance a piece of chocolate) is placed on a conveyor 13 for pick up and placement in a box 15 placed adjacent the conveyor. During this process, the tool of the robot travels from an initial pick-up position or waypoint w1 through a number of chosen waypoints w2, w3 to its final placement destination w4. According to the invention, the number and position in space of these waypoints can be specified during the programming session of the robot as will be described in detail below.

Figure 2:
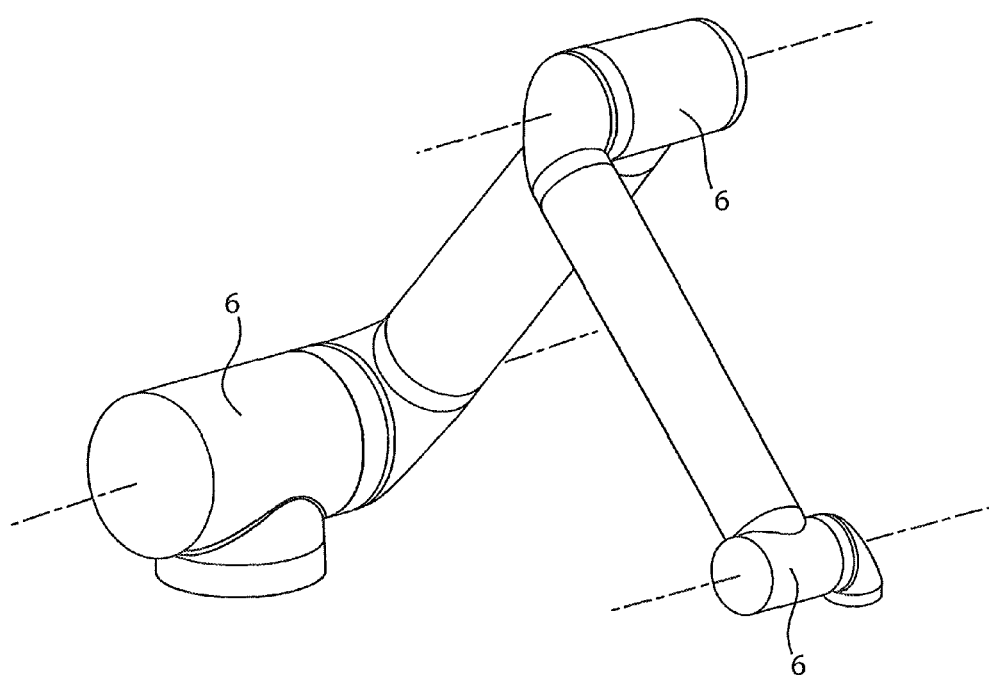
FIG. 2 shows a schematic perspective view of a second embodiment of the robot according to the invention comprising three joints.
Figure 3:
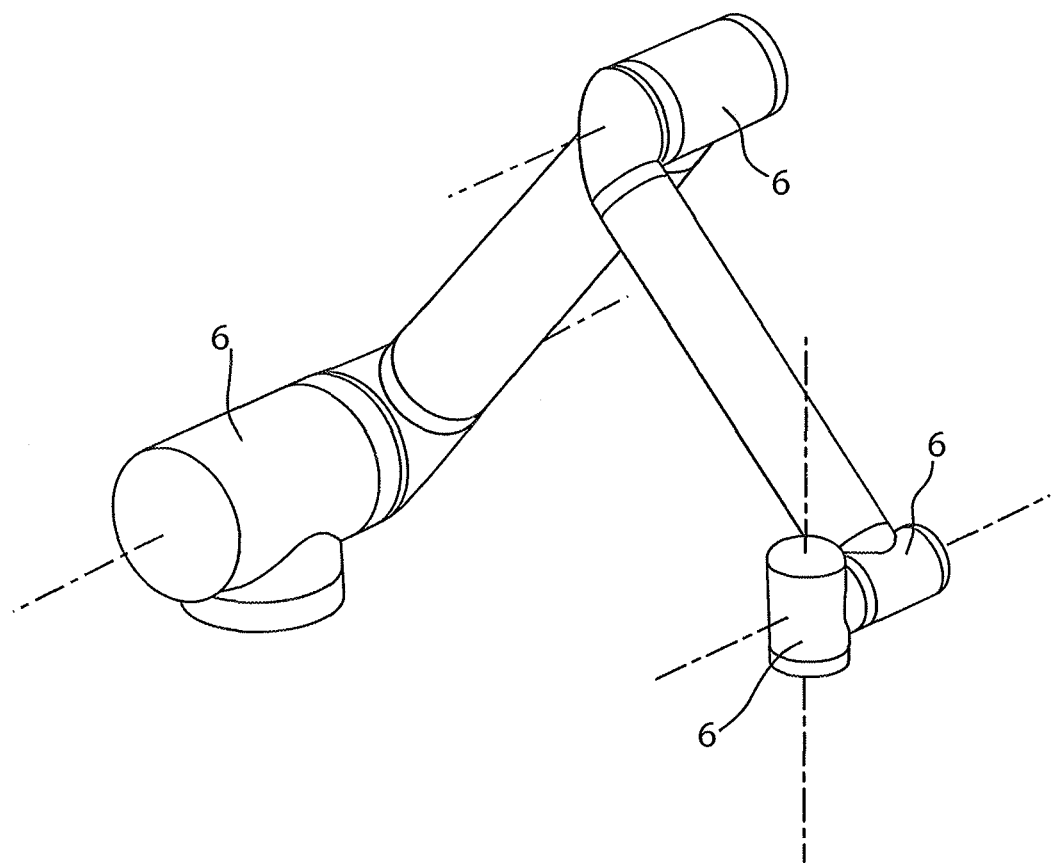
FIG. 3 shows a schematic perspective view of a third embodiment of the robot according to the invention comprising four joints.
Figure 4:
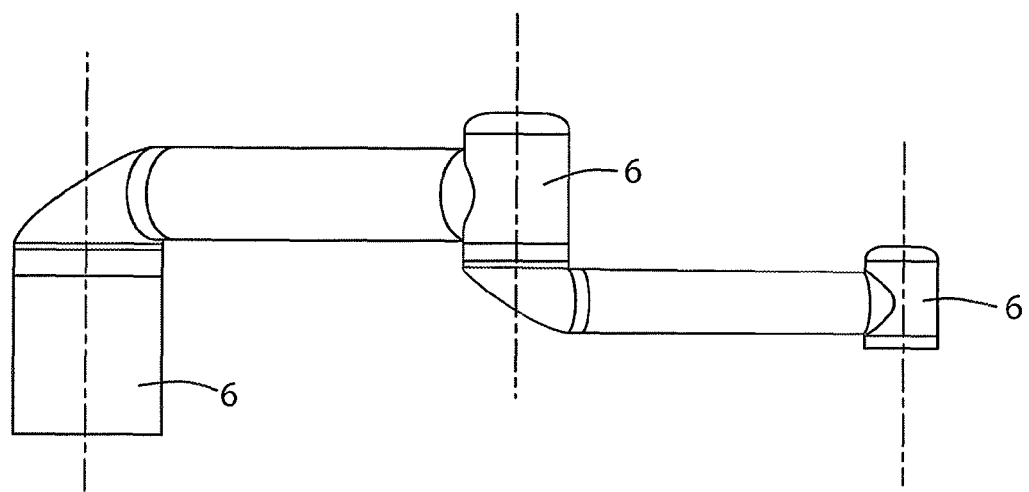
FIG. 4 shows a schematic perspective view of a fourth embodiment of a robot according to the invention (a so-called "Scara-robot")

In connection with FIG. 1, a specific embodiment of the robot according to the invention has been shown, but the robot according to the invention may be constructed in a number of different ways, for instance comprising different numbers of joints. Three such alternative embodiments are shown in FIGS. 2, 3 and 4. Specifically FIG. 2 shows a schematic perspective view of a second embodiment of the robot according to the invention comprising three joint, and FIG. 3 shows a schematic perspective view of a third embodiment of the robot according to the invention comprising four joints. FIG. 4 finally shows a schematic perspective view of a fourth embodiment of a robot according to the invention (a so-called "Scara-robot"). The embodiment shown in FIG. 1 makes it in principle possible for the tool to attain any position and orientation in space, but in cases where more restricted movements of the robot and more restricted positions and orientations of the tool are required, less complicated embodiments as for instance shown in FIGS. 2, 3 and 4 may be applied.

Figure 5:
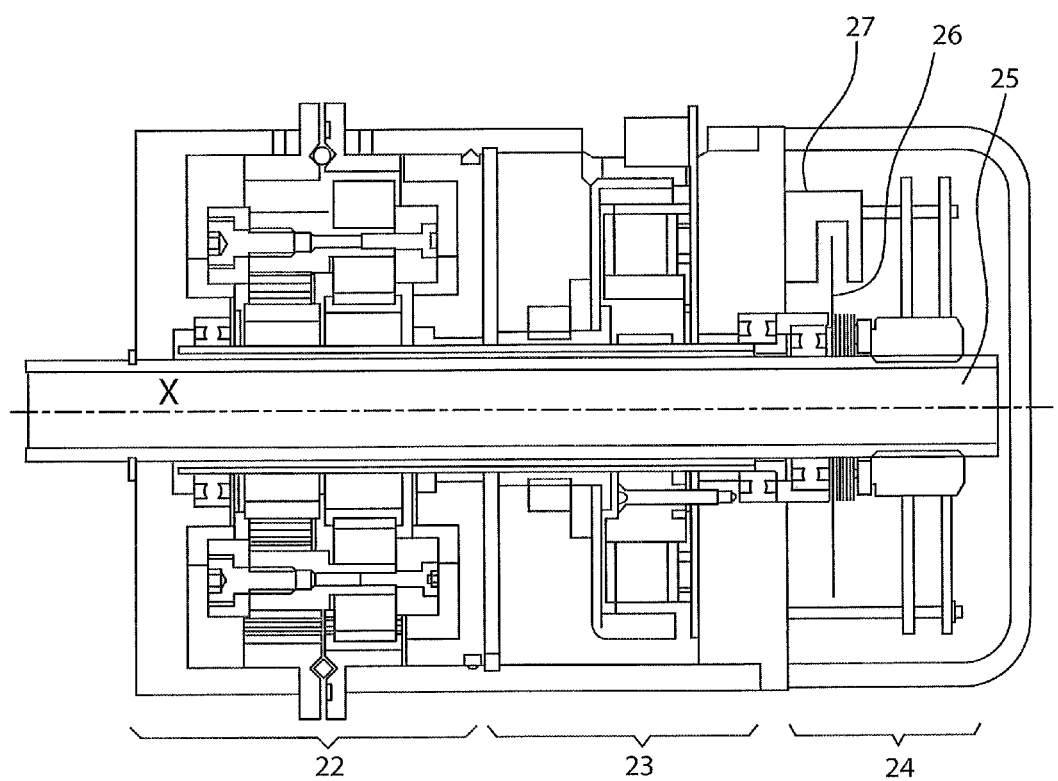
FIG. 5 shows a schematic cross sectional side view of a joint with the main components housed in the joint.

Referring to FIG. 5 there is shown a schematic cross sectional side view of an interconnecting means or joint according to an embodiment of the invention comprising the main components: a transmission 22, a motor 23 and encoding and controlling means 24. The latter comprises an encoder for registering the rotational angle α, β, γ, δ, ε, μ of the particular joint. The encoder could consist of an optical encoder (relative/incremental or absolute) for instance comprising a disc 26 mounted for rotation with the motor 23 and provided with a pattern of through openings through which a light beam from a light source placed in a housing 27 may penetrate. Encoders of this kind are known for a variety of purposes. The motor drive axle 25 running longitudinally in the interconnecting means is hollow in order to allow for the passage of electrical leads, not shown, between the various portions of the robot.

Figure 6:
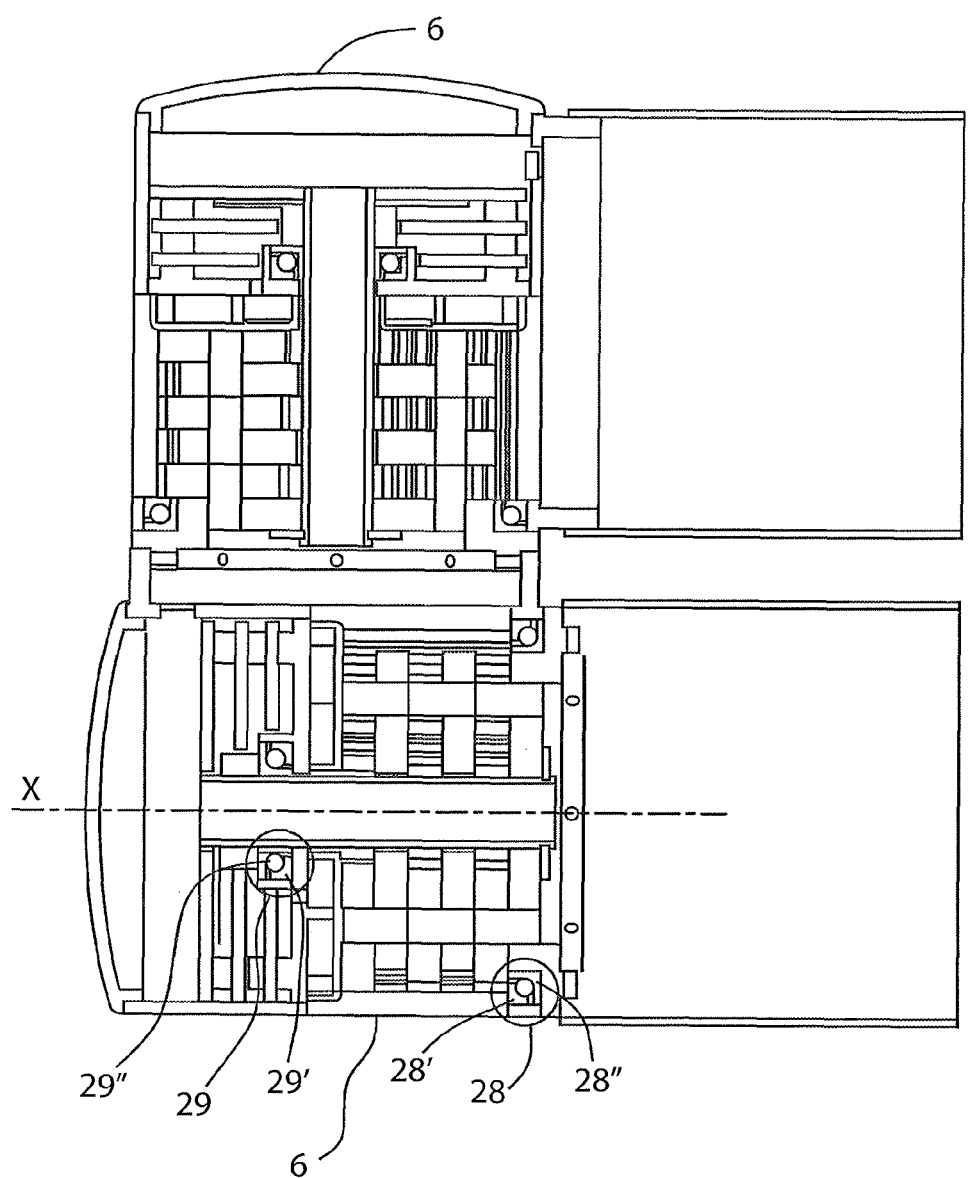
FIG. 6 shows a schematic cross sectional side view of two adjacent joints and the bearings used in these joints.

Referring to FIG. 6 there is shown a schematic cross sectional side view of two adjacent interconnecting means (joints) for instance in the wrist section of the robot and the bearings 28, 29 used in these means. The bearings comprise bearing surfaces or bushes 28', 28", 29', 29" inclined relative to the longitudinal axis X through the joint. These bearings are advantageous because a clearance or wobble-free bearing arrangement can be obtained by means of two simple and inexpensive ball or roller bearings in stead of using so-called "crossed roller bearings", which are much more expensive, but which can be made clearance or wobble free and take up tilt and forces in all directions.

By using joints according to the invention as for instance shown in FIGS. 5 and 6, it is possible to provide a modular robot, which can be designed (for instance with respect to the number of joints) according to individual applications.

A very important aspect of the present invention is to provide a user interface facilitating the programming and control of the robot according to the invention to such a degree that virtually any person may be able to use the robot. The following paragraphs describe various embodiments of such programming and control user interface means.

Figure 7A:
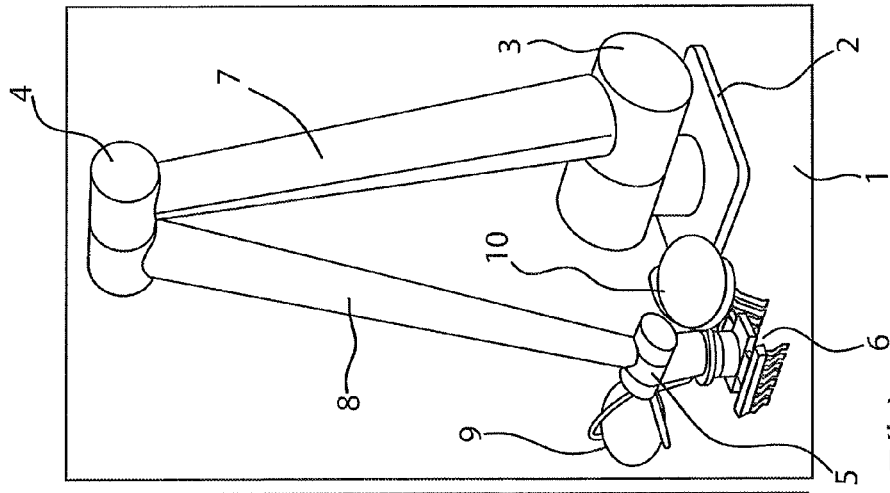
FIG. 7 shows a schematic view of an opening page shown on a display screen on a user interface/user control unit used to programme and control the robot, where the opening page basically comprises two portions, a menu portion where a user can enter instructions to the programming/control system of the robot and an image of the actual physical robot following the movements of the actual robot.
Figure 7B:
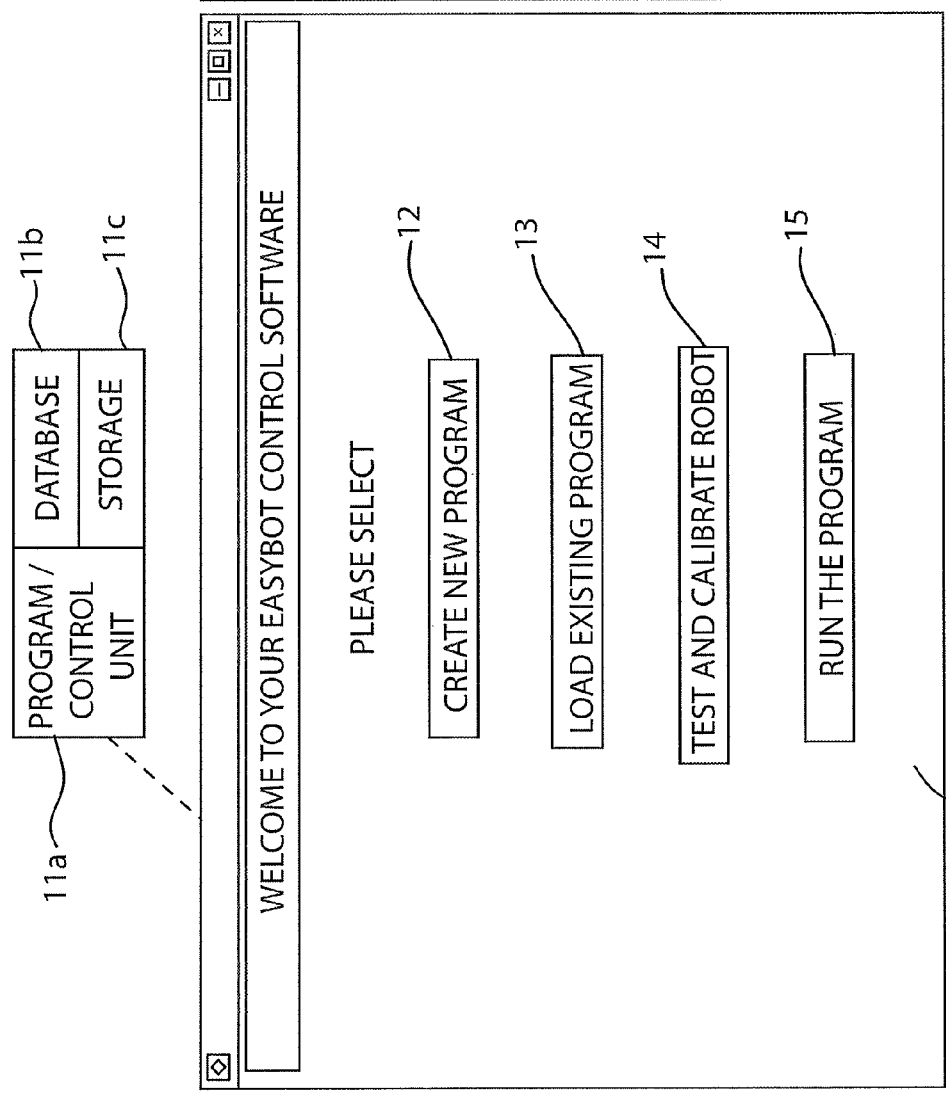

Referring to FIG. 7 there is shown an opening page of a programming/control software application according to the present invention to be displayed on a user interface 11. The user interface may as mentioned be provided as a dedicated external programming/control unit 11a, a kind of "remote control" of the robot or it may be implemented on a personal computer, together with an information storage 11b and a database 11c as schematically depicted. It is, however, also possible to distribute the interface means, whereby a part of these, for instance display screen and information storage means for storing chosen parameter combinations, and descriptions of the surroundings are provided in an external unit, whereas guide and sensor means for actually guiding the robot through the path in space, which it must follow for performing the required task and for recording the positions of the tool and joints in space, are provided as separate units, which might be placed at appropriate places on the robot programming. Such separate means may also be used for determining the position and special extent of elements/obstacles and boundaries in the surroundings. The opening page shown in FIG. 1 comprises basically a menu section (a) and a picture section (b), and in this example is shown a schematic perspective view of an other embodiment of a robot according to the present invention somewhat differing from those described above. Although the following sequence of screen images shown in FIGS. 8 to 14 show only the menu portion (a), preferably these images shown on the display screen of the programming and control unit 11a during programming and/or control sessions will comprise both the menu portion shown in FIG. 1 under (a) and a CAD presentation of an appropriate robot as shown under (b) in FIG. 1 with the CAD image of the robot shown corresponding to the parameter choice of the corresponding menu portion. In other words, the CAD image moves with the changes of parameter settings performed by means of the menu portion. Also as mentioned the image of the robot (b) may comprise graphical representations of relevant objects, boundaries etc. in the surroundings.

The robot according to the shown embodiment of the invention is generally designated by reference numeral 1 and comprises a base 2, joints 3, 4 and 5, arm sections 7 and 8 and an end effector 6 in the shown embodiment in form of a gripper. Optionally one or more vision cameras 10 may be provided on the robot, in the shown embodiment in the vicinity of the end effector.

The menu portion (a) generally designated by reference numeral 11 contains the opening page of the control software application of the invention and provides the user with a choice between the creation of a new program, 12, the retrieval of a pre-loaded program, 13, a test and calibration procedure, 14 and the execution of the program, 15.

Figure 8:
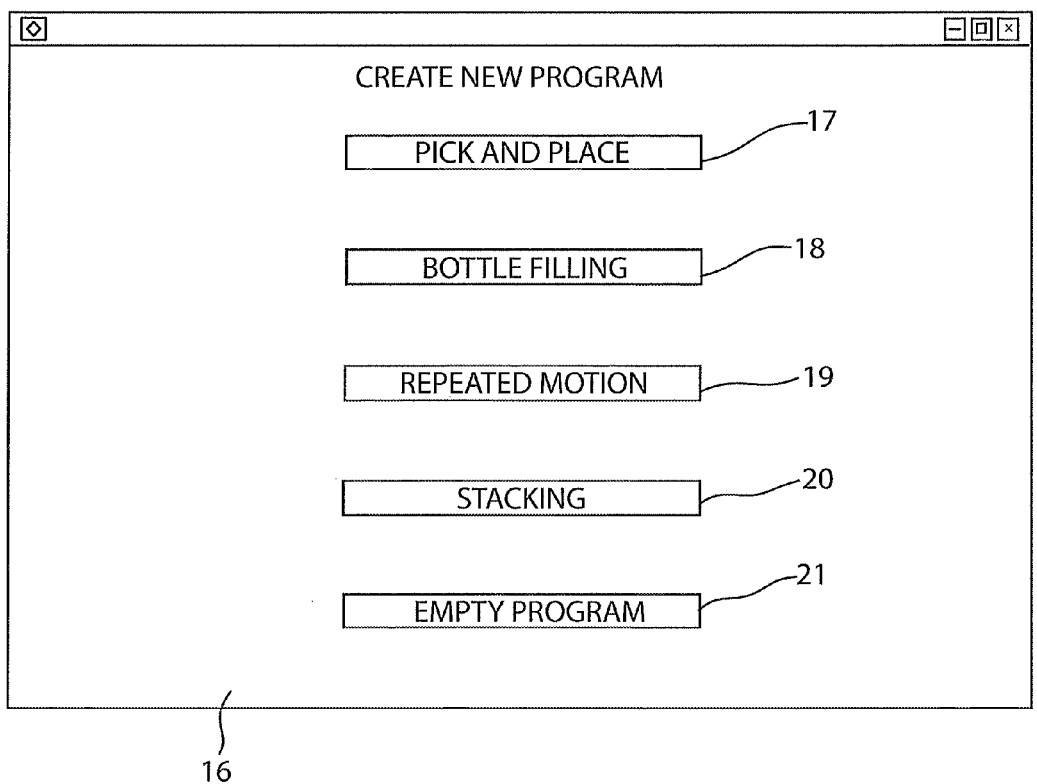
FIGS. 8 to 10 show a sequence of display screen images displayed to a user on the user interface during an initial sequence of steps to be performed by the user during a programming session of the robot.

Assuming the user selects "Create new program", 12, the menu portion shown in FIG. 8 appears (preferably together with the CAD picture of the robot as mentioned, although this picture is omitted from the following figures).

FIG. 8 shows the "Create new program" menu 16 chosen by the user. In this menu, the user may choose between different operations to be performed by the robot. In the example shown in FIG. 8, these operations comprise a "pick-and-place" operation 17, a "bottle filling operation" 18, a "repeated motion" operation 19, a "stacking" operation 20 and an empty program 21, which may be specified by the user.

Figure 9:
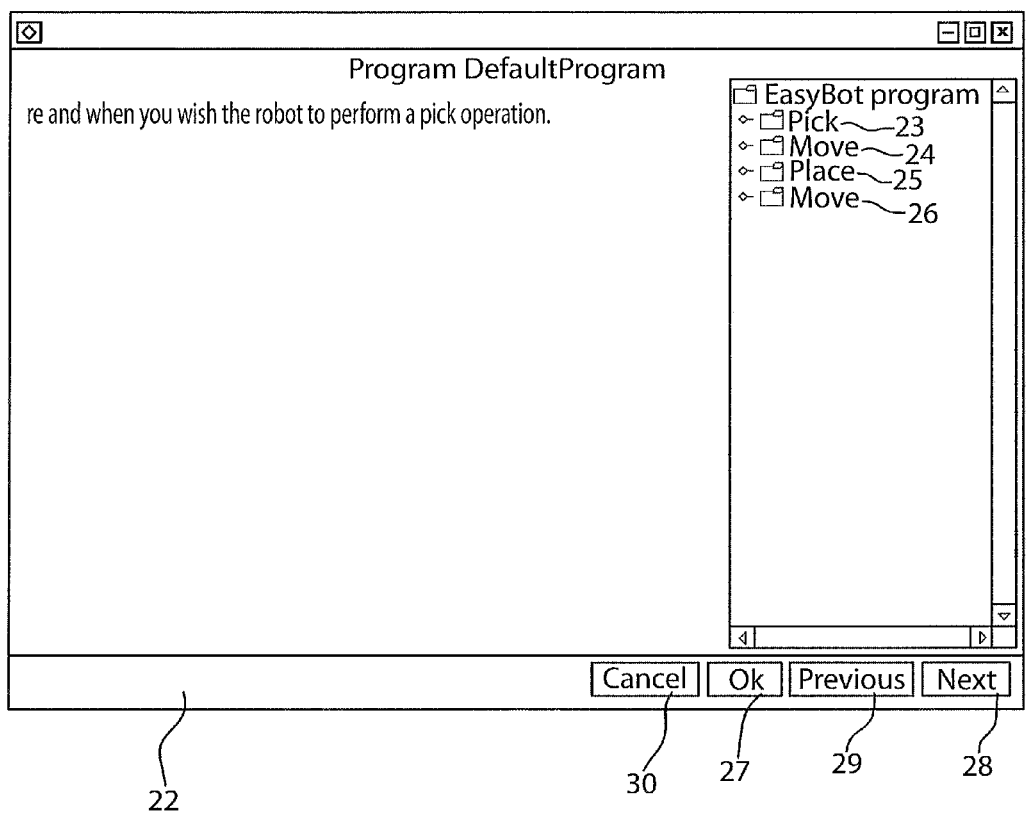

Assuming the user selects "pick and place", the menu portion shown in FIG. 9 appears on the display screen of the programming and control unit.

The pick-and-place operation comprises four actions to be performed by the robot indicated by 23, 24, 25 and 26 on FIG. 9, and these may be activated for instance by a computer mouse or by a touch in the corresponding icon in case of a touch screen. Specifically 23 indicates a pick operation, 24 indicates the movement to the destination via a sequence of waypoints to be described below, 25 indicates the place operation performed by the end effector at the destination point and 26 indicates the movement of the end effector back to the initial position. Using the menu shown in FIG. 8 and the subsequent figures, the whole pick-and-place operation can de defined and stored for subsequent automatic execution by the robot.

Figure 10A:
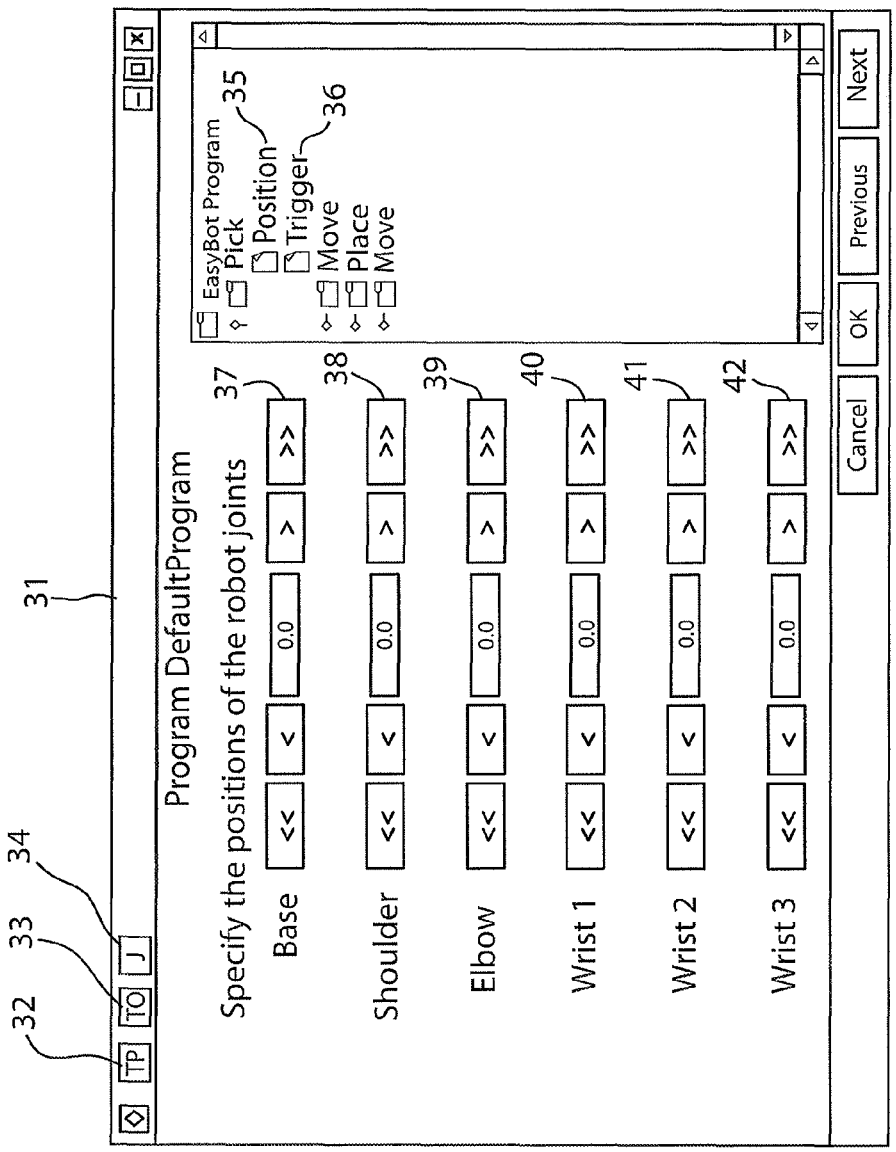

Assuming the user chooses to define the pick operation, the icon 23 is activated and the menu portion 31 shown in FIG. 10(a) will appear. By pressing the position icon 35, the position/orientation assumed by different portions of the robot can be specified. Thus, by pressing icon 32 (tool position), the position of the tool in space at the pick-up point can be specified and by pressing icon 33 (tool orientation), the orientation of the tool at this point can be specified. The angular orientation ($\alpha$, $\beta$, . . . ) of each of the robot joints can be specified if desired by pressing icon 34 (joints). In the example shown in FIG. 10(a), the joint icon 34 has been pressed resulting in the angular orientation adjustment means indicated by reference numerals 37, 38, 39, 40, 41 and 42 corresponding to each of the joints of the robot. Furthermore, the event triggering the operation of the tool can be specified by pressing the trigger icon 36 as described below in connection with FIG. 12.

Figure 10B:
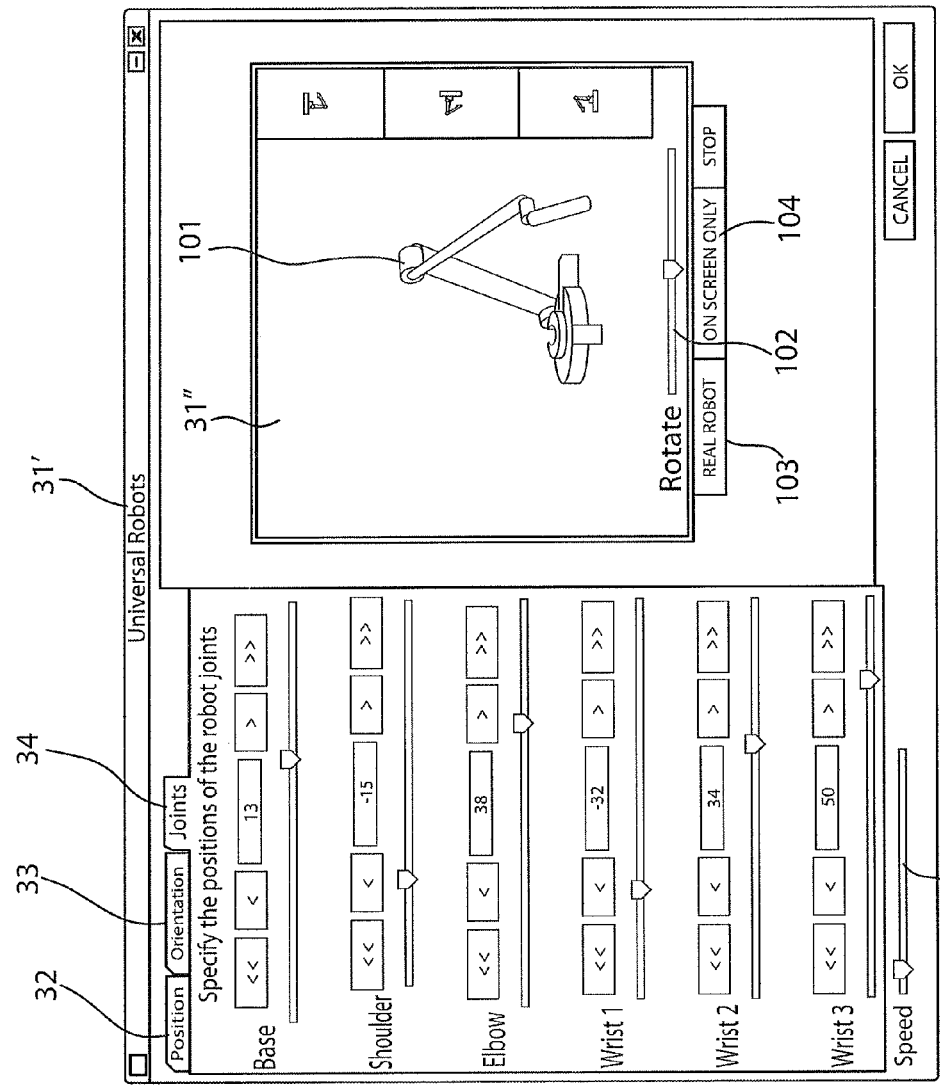

An alternative screen picture 31' corresponding to the one shown in FIG. 10(a) is shown in FIG. 10(b), where a CAD-generated picture 101 of the robot is shown in the picture field 31". By application of the icons 102, 103 and 104, the robot, either the real robot or the CAD picture, can be rotated. The speed of rotation of the robot and/or of the robot joints can be determined by means of the slice control icon 105, whereby either a coarse or fine adjustment of the robot will be possible.

Defining the position of the tool in space requires the specification of three co-ordinates. If accomplished from the user interface, this can be done in a number of ways. One possibility would be to apply means on the display screen corresponding to those shown in FIG. 10(a) or (b) for adjustment of the angular orientation of the joints, i.e. the screen picture could contain three of the adjustment means shown in FIG. 10(a) or (b), one of these for specifying the X co-ordinate, one for the Y co-ordinate and one for the Z co-ordinate of the tool. Alternatively, the co-ordinates could be entered from a keyboard. As a further alternative, a screen picture as shown schematically in FIG. 11(a) could be used. It is understood that in stead of specifying the position of the tool by its Cartesian co-ordinates, other co-ordinate systems (spherical, cylindrical etc.) might be applied if desired. When the control means specifying the position of the tool are manipulated, the picture of the robot 43 moves correspondingly.

Figure 11A:
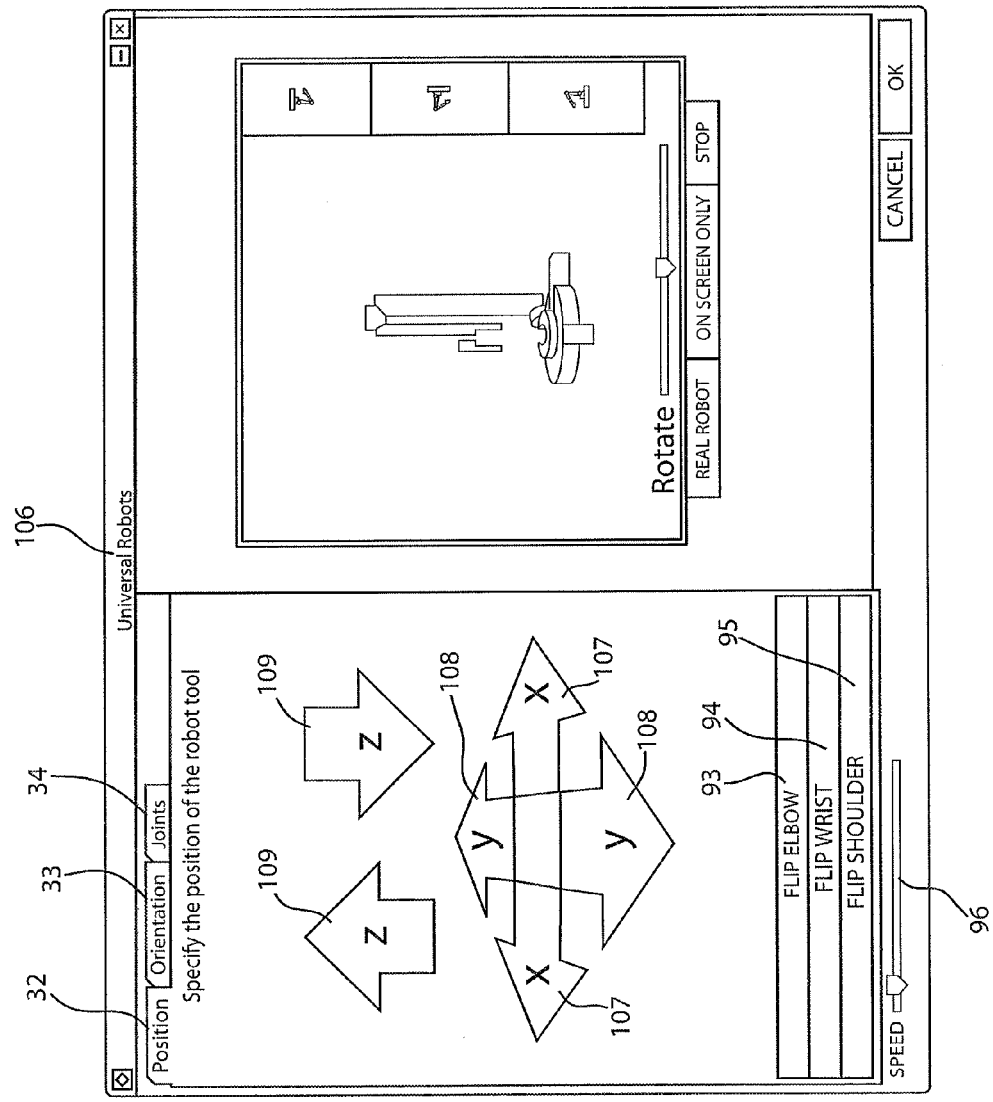
FIGS. 11(a) and (b) show a schematic view of a specific embodiment of the menu portion of the screen page used for programming the position and orientation of the tool at the various waypoints along the path of the tool in space from an initial position to a final position and back to the initial position.

Referring to FIG. 11(a) there is thus shown a screen page 106 for specifying the position of the tool. According to this embodiment, the X, Y, Z co-ordinates of the tool can be controlled by the corresponding arrow-shaped icons 107, 108 and 109 in FIG. 11(a). The speed of adjustment can be set by means of the slide control icon 96. The icons 93, 94 and 95 are introduced because a robot can comprise several joint configurations yielding the same Cartesian position of the tool. By means of the icons 93, 94 and 95 it is possible to choose between eight of these. For instance, it is possible to choose between a configuration where the elbow of the robot is in an upper position or a lower position, etc.

Figure 11B:
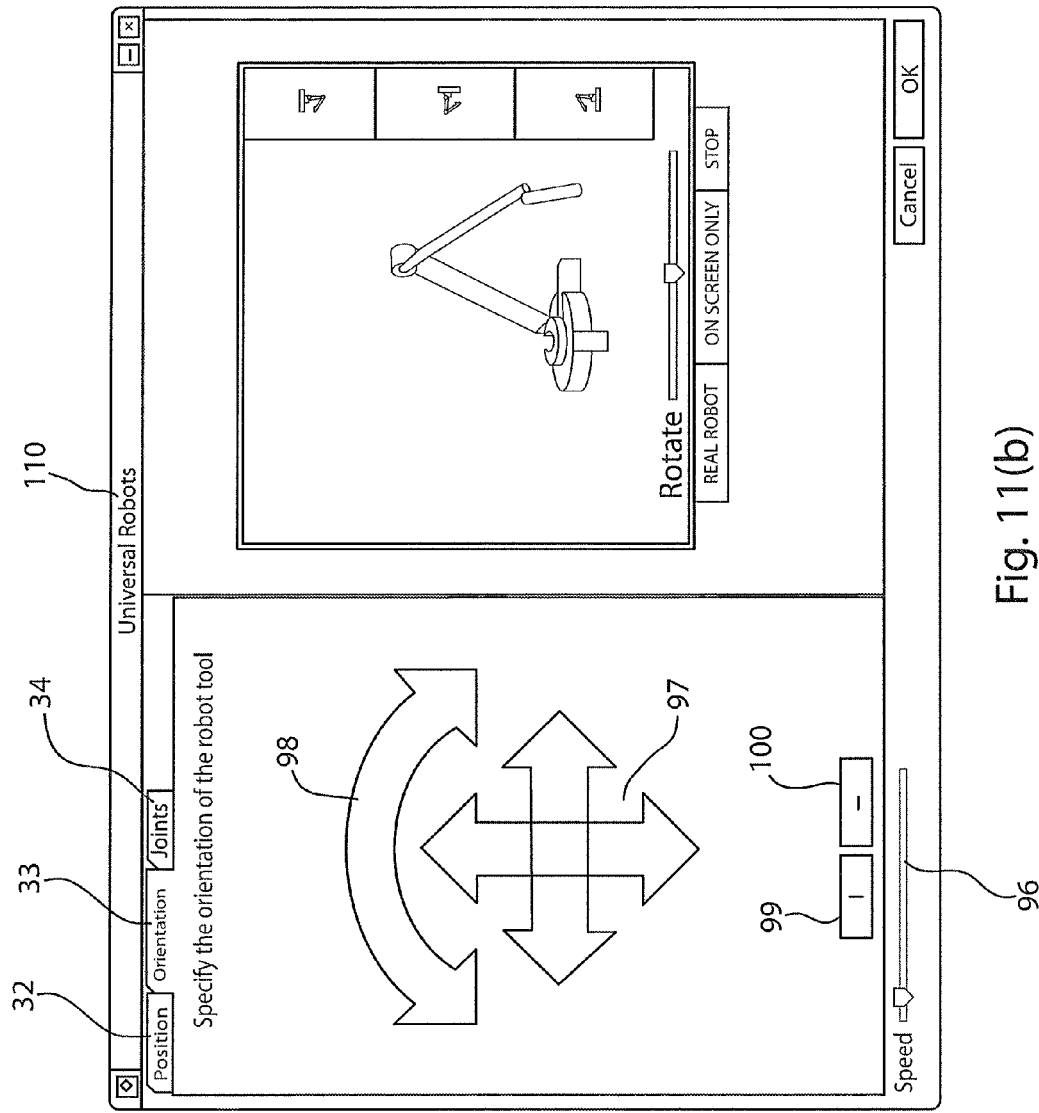

Referring to FIG. 11(b) there is shown a screen page 110 for specifying the orientation of the tool by setting the co-ordinates: roll, pitch and yaw by means of arrow icons 98 and 97, respectively. The icons 99 and 100 are used for positioning of the robot tool vertically and horizontally, respectively.

As a further alternative for specifying the position of the tool (and its orientation and in fact all movements of the robot), a joystick or a 3D-mouse might be used. A 3D-mouse could according to the invention be used for other programming and control purposes as well. For instance a 3D-mouse could be used to record the position and spatial extent of objects and boundaries in the surroundings, such as obstacles to be avoided by the robot and boundaries of the work area at the application site. As mentioned, this information might be stored in storage means connected to the control system for later retrieval and application.

Figure 12:
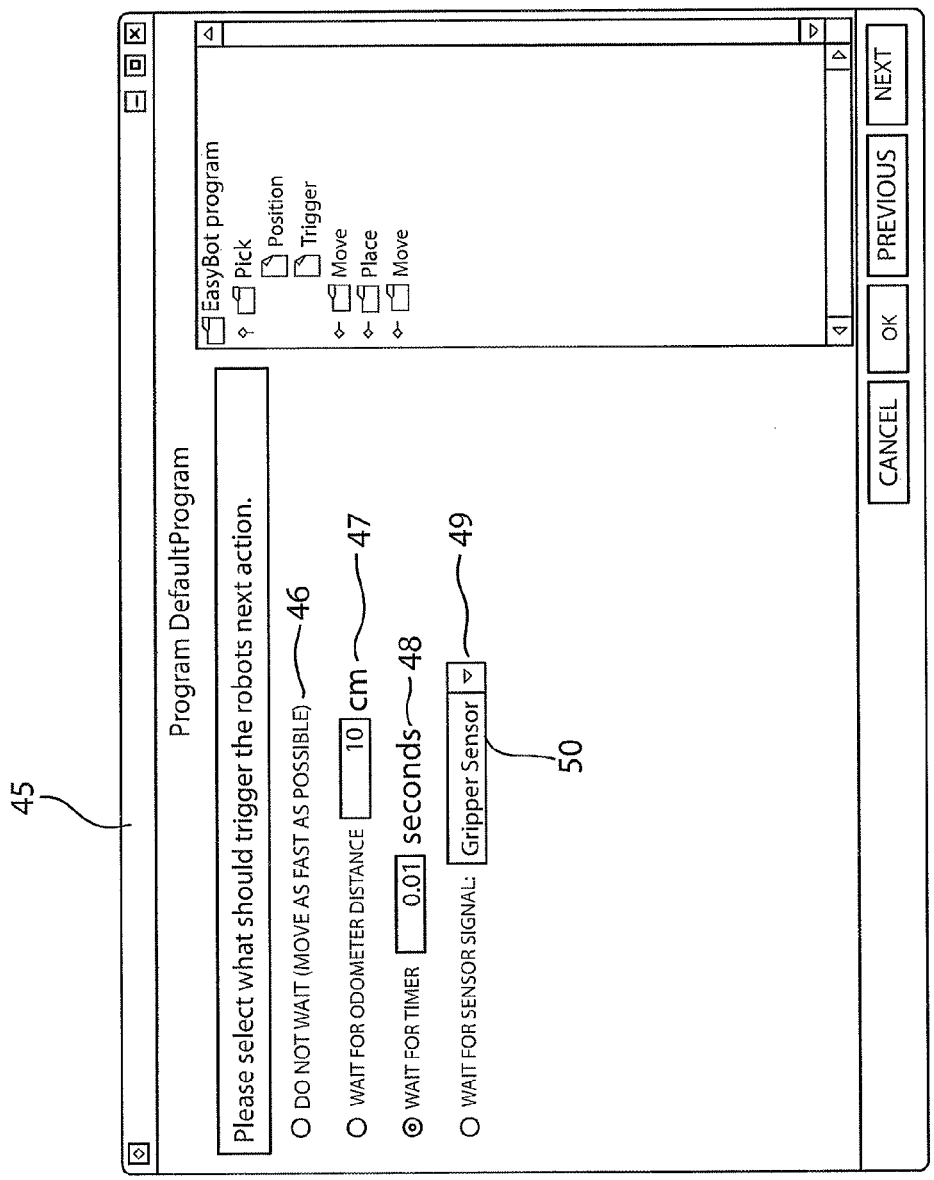
FIGS. 12 to 14 show schematic representations of screen pages presented to the user during the remaining programming steps of the robot.

Referring to FIG. 12 there is shown the menu portion 45 which will appear on the display screen of the user interface if icon 36 (trigger) is pressed on the menu portion shown in FIG. 10(a). Using the menu portion 45, various parameters defining the triggering of the tool during the pick-up operation can be specified. Four such trigger parameters are indicated by reference numerals 46, 47, 48 and 49, but it is understood that other parameters might be used too. Specifically 46 indicates an option where no triggering event is applied, i.e. the robot performs the operation as fast as possible. Reference numeral 47 indicates activation of the tool after the object has traveled a certain distance, which can be specified on the menu portion 45, and which in the example shown amounts to 10 cm after a trigger event, for instance the passage of the object through a light switch. Alternatively as indicated by reference numeral 48, the tool may be activated after the object has traveled for a given interval of time after the trigger event, where the interval can be specified on the menu portion 45 and which in the example shown amounts to 0.01 seconds. As a further alternative, the tool may be provided by sensor means providing a signal to the control system of the robot, thereby activating the tool. This option is indicated by reference numeral 49 in FIG. 12. It is possible to choose between different sensors and/or sensor locations as indicated by reference numeral 50.

Figure 13:
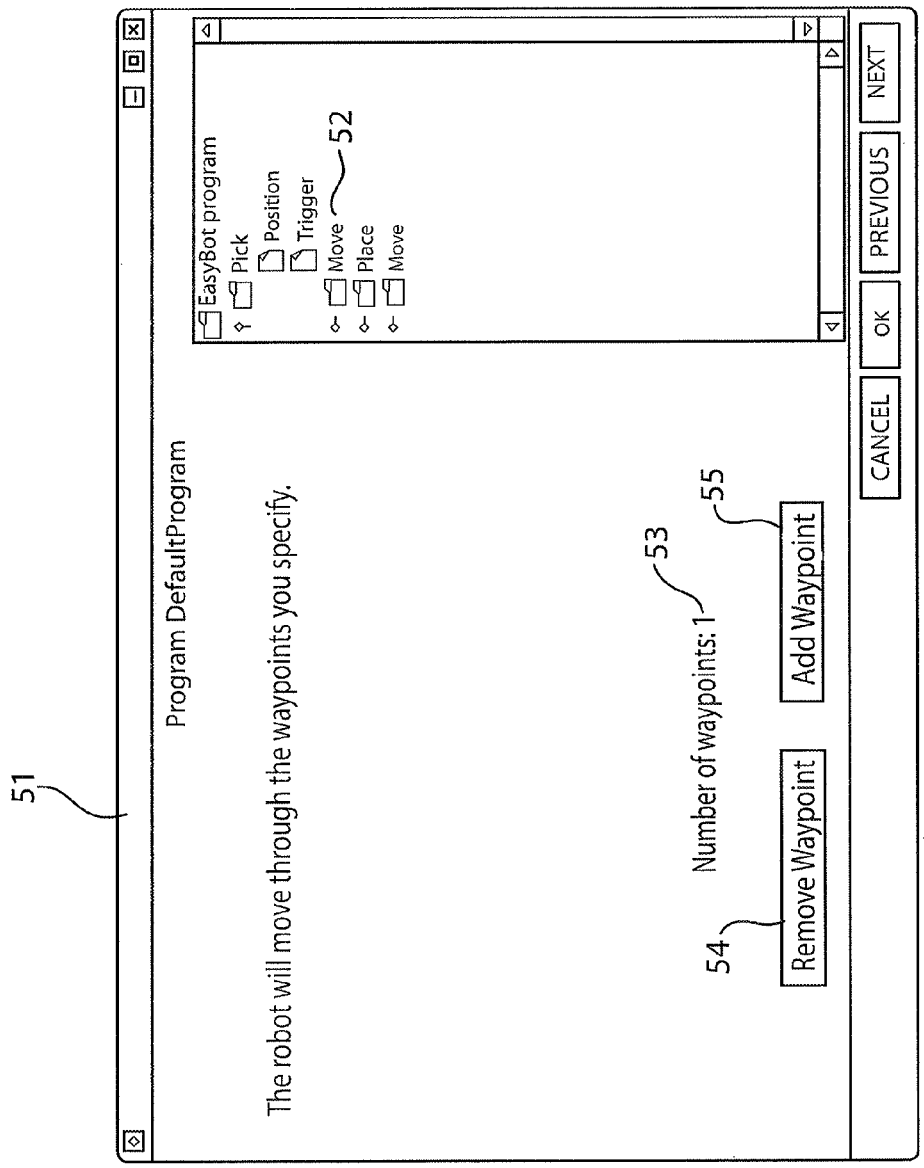

The next step in the programming procedure is shown in FIG. 13 and consists of specifying a suitable number of waypoints through which the tool of the robot shall move from an initial position to a final position and back to the initial position. The menu portion 51 corresponding to this step is shown in FIG. 13. The path in space from initial to final position of the tool can be the same as the path followed by the tool on returning from the final to the initial position but different paths may also be chosen and specified if appropriate. After pressing icon 52, the waypoints can be specified by their co-ordinates in space, for instance in the same manner as shown and described previously in connection with FIG. 10. Alternatively, a 3D-mouse or similar device may be positioned at the different waypoints and the corresponding co-ordinates be entered into the control system of the robot directly from the mouse. In fact, it could be possible to trace the whole continuous path in space of the tool and store this in the control system in stead of storing a number of distinct points in space. In principle it may be possible under circumstances not to specify any waypoints at all, but usually at least waypoint between the initial and final position of the tool will be required. The chosen number is indicated on the menu portion 51 at 53, and waypoints can be removed or added at 54 and 55.

Figure 14:
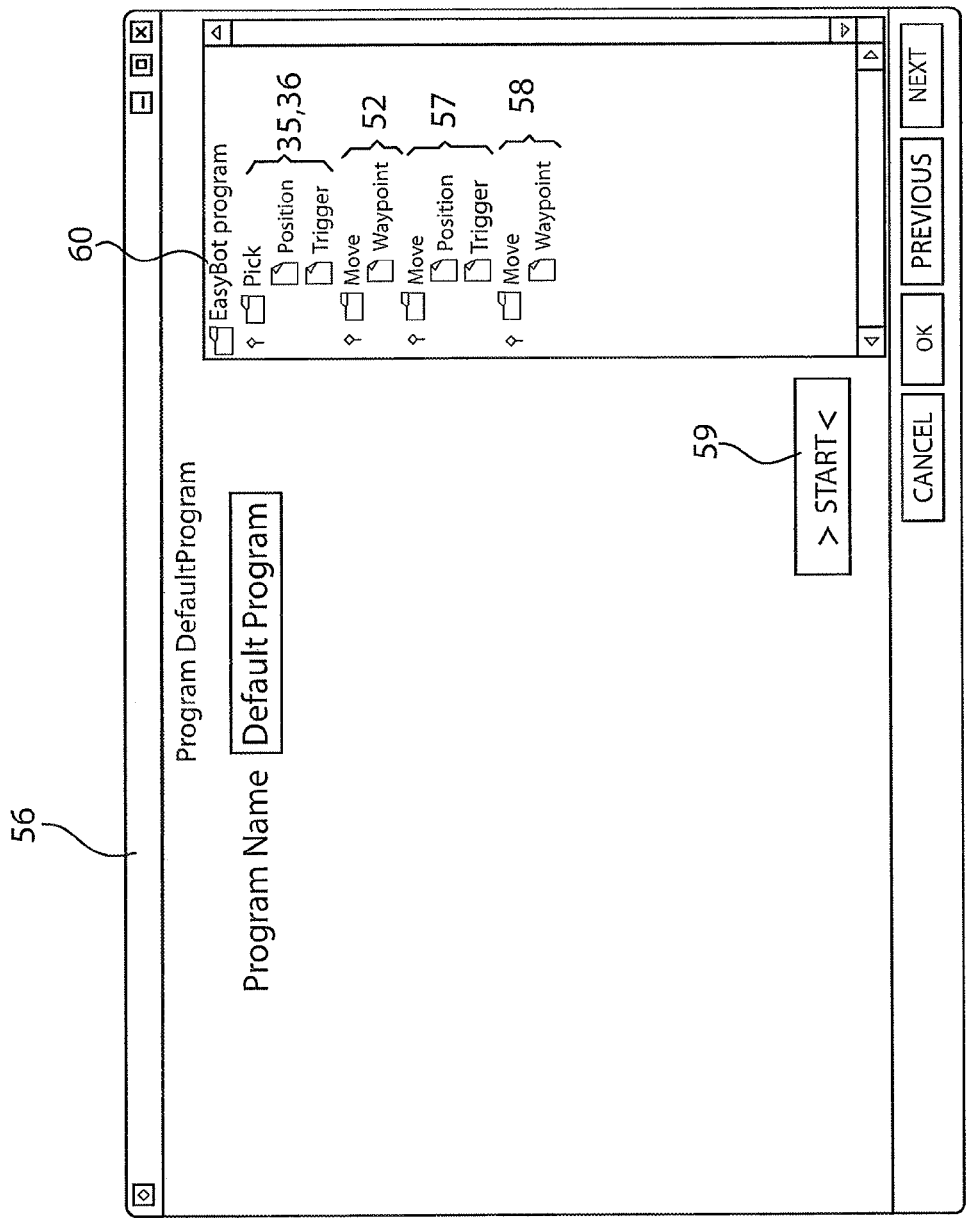

Referring to FIG. 14, the two remaining programming steps of a pick-and-place operation is described, i.e. the specification of the position and triggering of the place operation of the tool at the final position and the return of the tool to the initial position. The specification of these steps corresponds to the specification of the initial position and triggering of the tool and the movement of the tool through a chosen number of waypoints from the initial to the final position of the tool and will hence only be described briefly in the following. On the program portion 60 of the page, the previously chosen position and triggering of the tool during pick up and movement from initial to final position can be retrieved from icons 35, 36 and 52. The position and triggering events/methods/sensor means can be specified at icons 57 and the return path from final back to initial position can be specified at icon 58.

After the specification of all pertinent parameters relating to the pick-and-place operation, the program is ready for execution. Starting the program from icon 59 will result in both the physical robot and its picture (CAD representation) on the screen carrying out the programmed operations slowly in order to ascertain the correct and unimpeded operation of the robot. After this control step, the robot is ready for normal operation.

An alternative embodiment of a program "wizard" used for programming the robot according to the invention will be briefly shown and described by reference to FIGS. 15 to 23. These figures show a sequence of CAD images of a robot according to an embodiment of the invention displayed on the display screen of the user interface during the various programming stages of the robot. The actual movement of the robot—and hence its CAD-generated image on the interface screen—will in this case take place by actually leading the physical robot through the various steps performed during programming of the robot. Alternatively, the robot might be controlled in a manner corresponding to that described previously in connection with FIGS. 7 to 14. In conjunction with the description of this sequence of movements of the robot means and procedures for controlling the pick up of an object by the tool of the robot will be described specifically in connection with FIG. 18.

Figure 15:
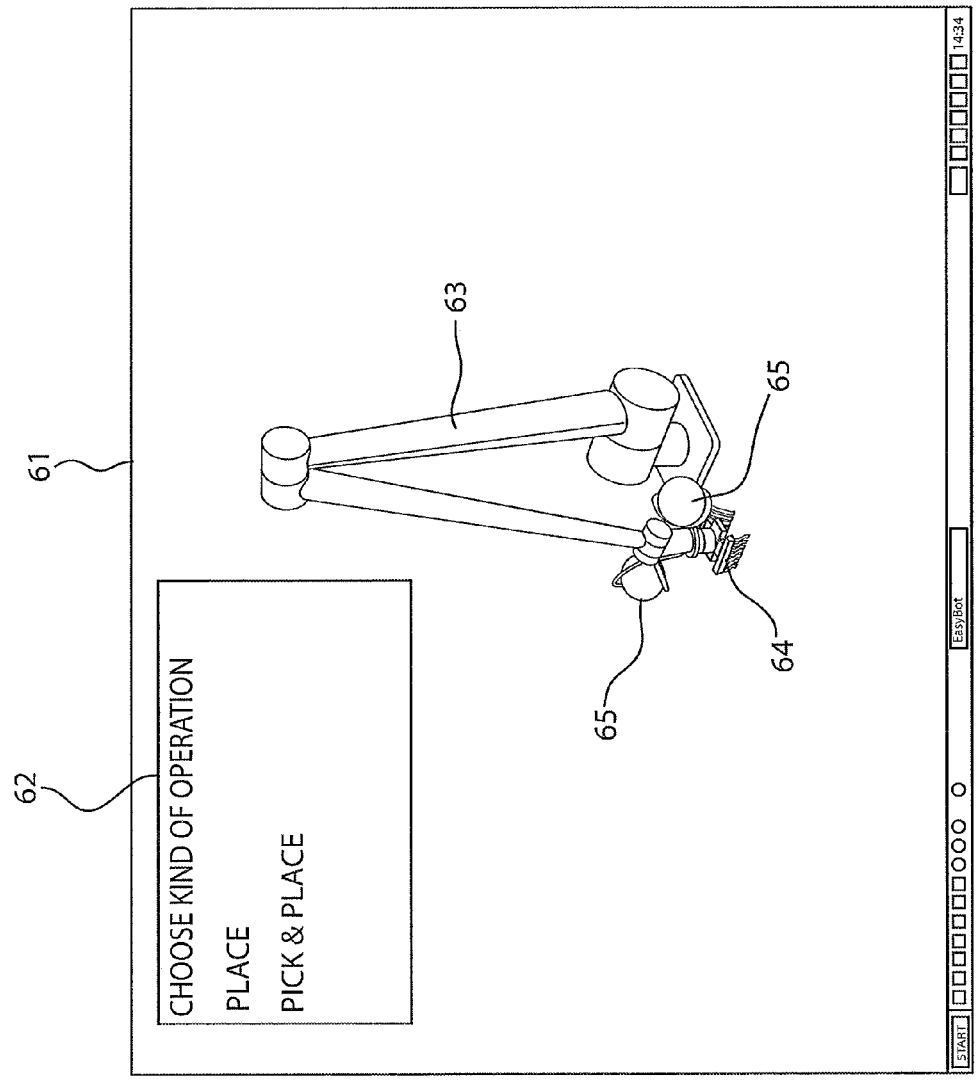
FIGS. 15 to 23 show a sequence of CAD images of a robot according to an embodiment of the invention displayed on the display screen of the user interface during the various stages of an operation of the robot, the robot during programming being either controlled from the user interface as described in FIGS. 6 to 13 or being actually gripped by the user and guided through the waypoints along the path in space.

Referring to FIG. 15 there is thus shown a screen image of an opening page 61 of the programming wizard according to this embodiment of the user interface of the present invention. Specifically the page comprises a menu portion 62 and an image (CAD representation) of a robot 63 according to one embodiment of the invention. The robot 63 is provided with a gripper tool 64 and two cameras 65 used (among other things) for specifying the object to be gripped and handled by the robot. The following series of figures again relate to a pick-and-place operation, but it is understood that numerous other operations could also be programmed using this embodiment of a wizard according to the invention. The kind of operation is specified on the menu portion 62, in the shown example comprising two operations: (1) place and (2) pick and place. The latter is chosen as mentioned.

Figure 16:
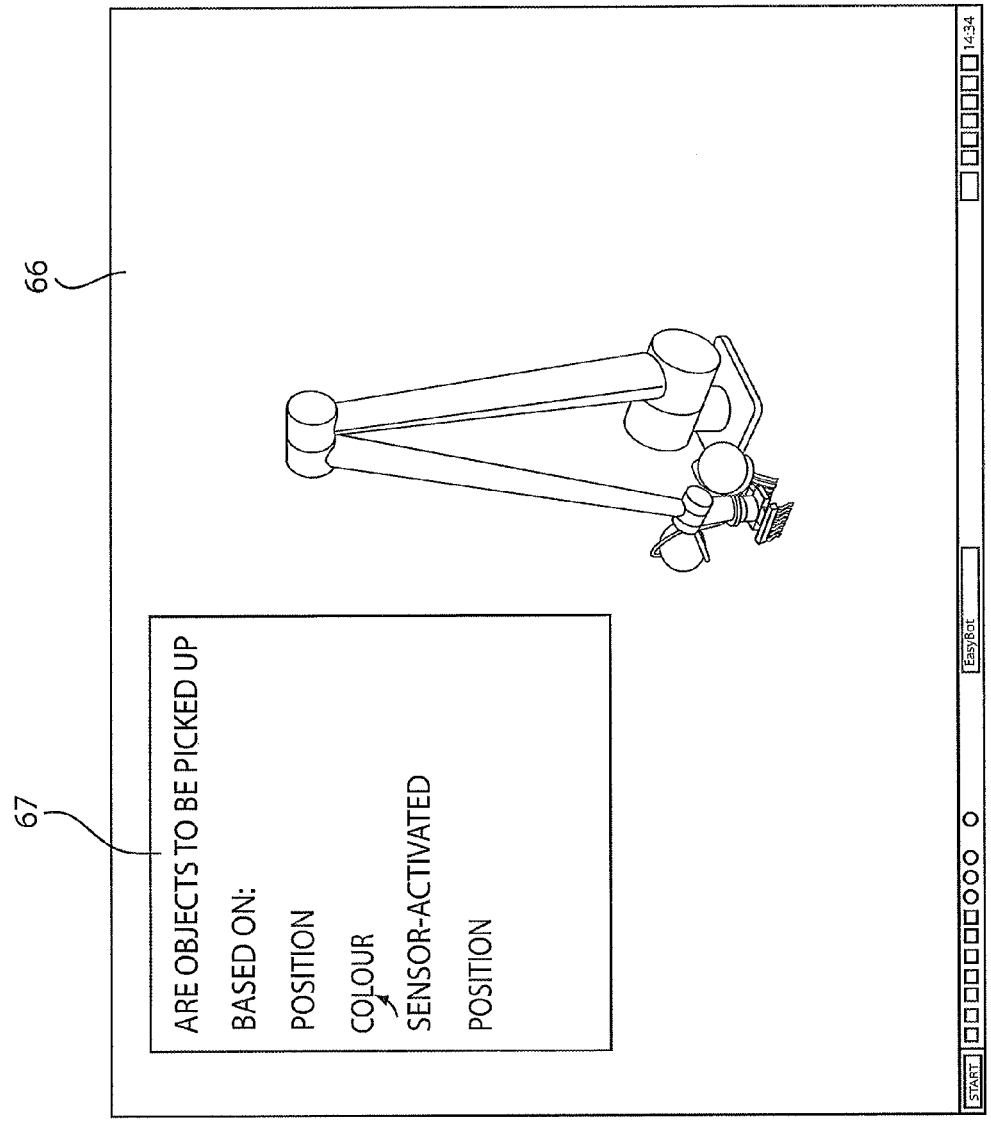

Referring to FIG. 16 there is shown the page 66 presented to the user during the programming operation. At 67 the user specifies whether the object is to be picked up based on position, colour or sensor activated position. The colour option is chosen as indicated by the arrow.

Figure 17:
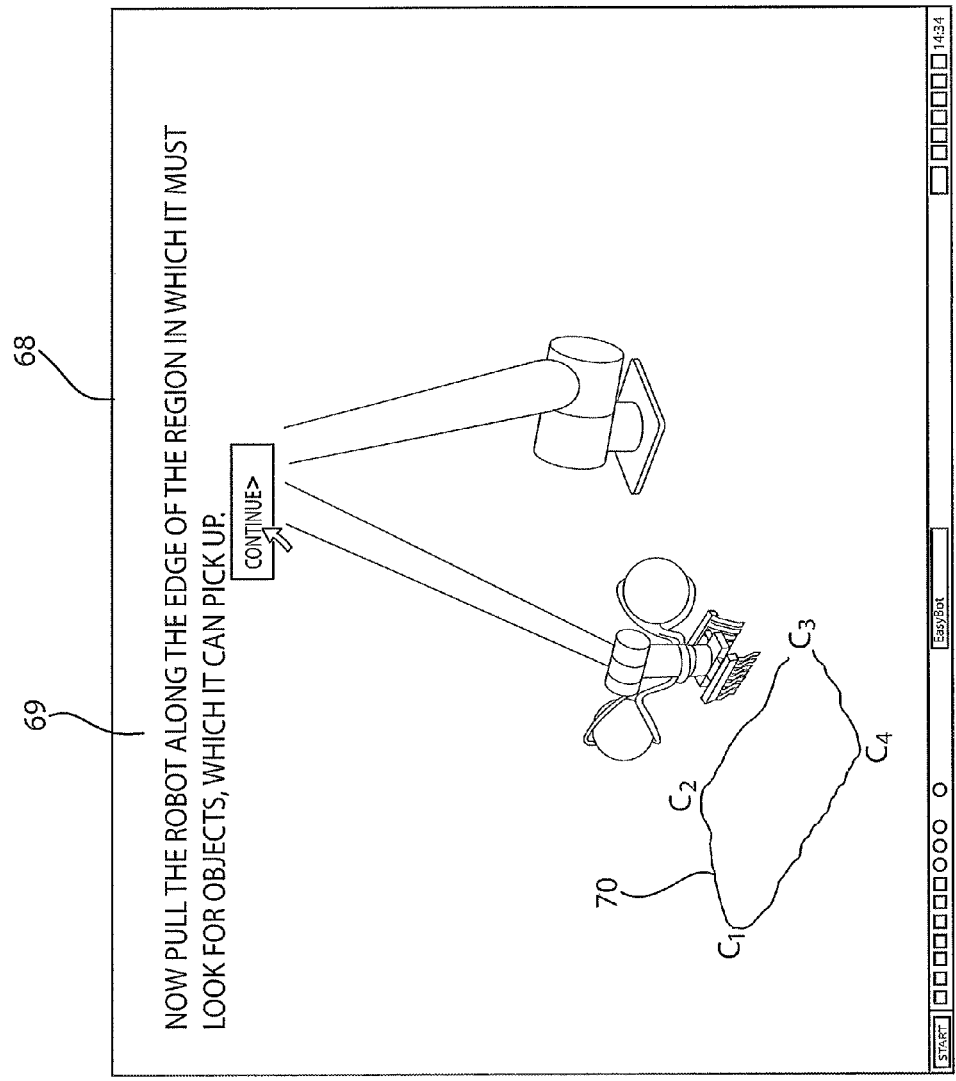

Referring to FIG. 17 there is shown the next page 68 shown during the programming operation comprising the user indication of the region 70 within which objects are to be picked up. As explained at 69, this region 70 is specified by actually leading the tool of the robot along the entire boundary of the region. Alternatively it might be sufficient to define the region 70 by a limited number of distinct points, for instance the corners c1, c2, c3 and c4 of the region 70. This might suffice in case of pick-up regions of simple geometry. The Danish text at 69 actually reads in translation: "Now pull the robot along the edge of the region in which it must look for objects, which it can pick up. [Continue>]".

Figure 18:
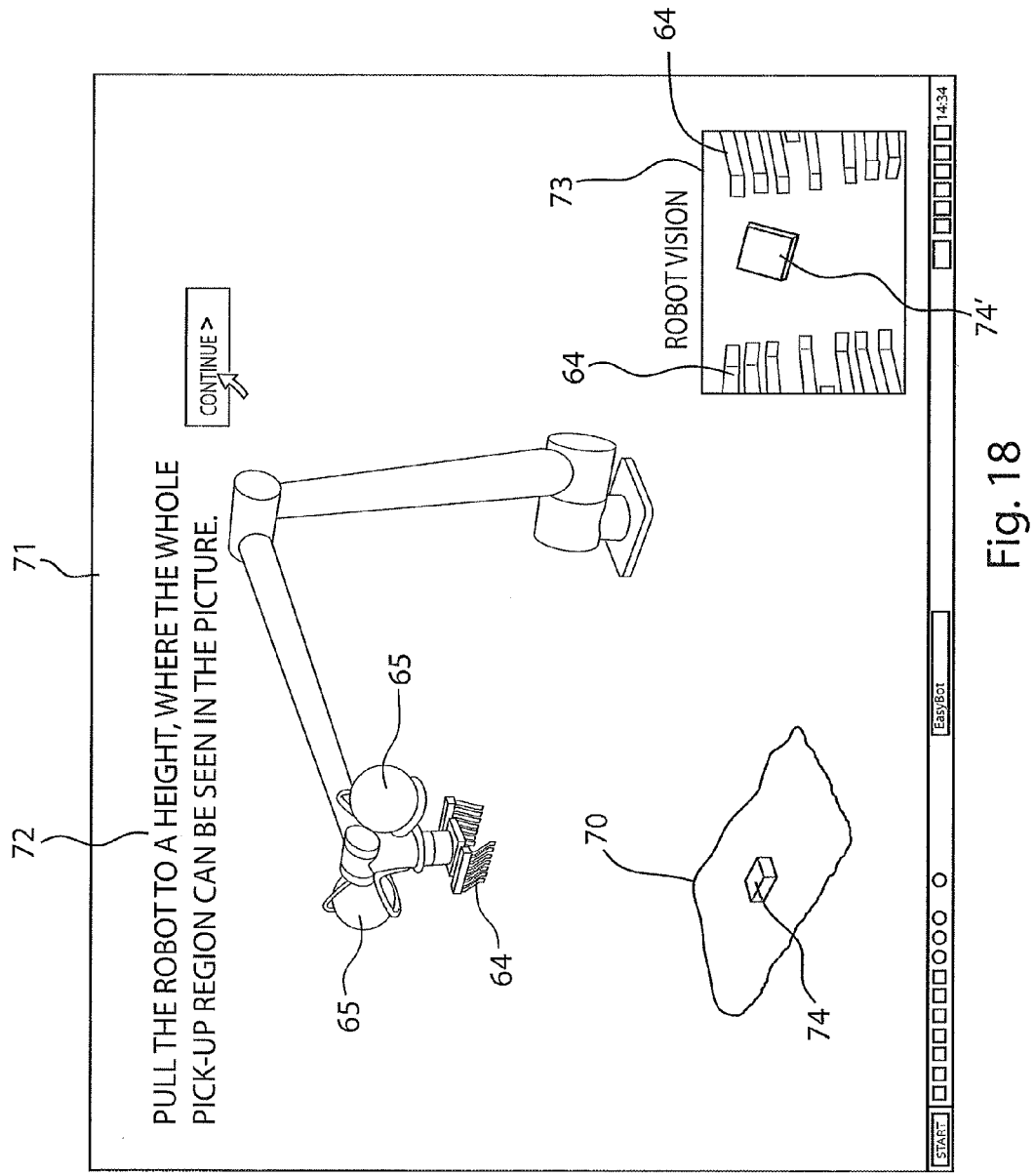

Referring to FIG. 18 there is shown the next page 71 used in a first step in an object identification method according to the invention. As indicated at 72 (in translation: "pull the robot to a height, where the whole pick-up region can be seen in the picture. [Continue>]") the tool of the robot is elevated above the defined pick-up region 70 to such an elevation that the whole pick-up region can be seen on the picture 73 recorded by means of at least one of the cameras 65 placed adjacent the tool 64, a portion of which can be seen in the picture 73 together with the picture 74' of the object 74.

Figure 19:
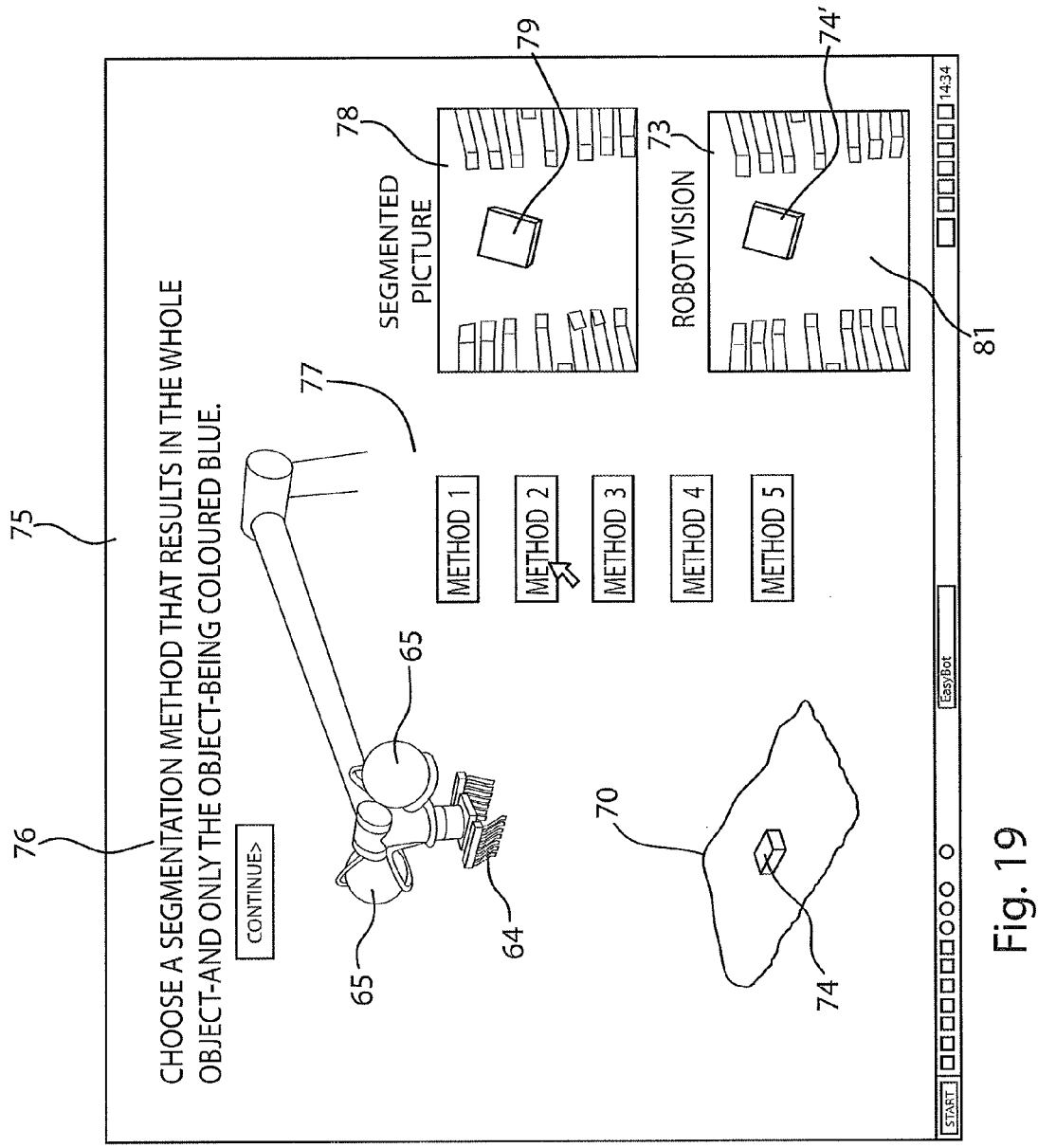

Referring to FIG. 19 there is shown the next page 75 presented to the user and comprising the next step of the object identification or segmentation method according to this embodiment of the invention. The text at 76 reads in translation: "Choose a segmentation method that results in the whole object—and only the object—being coloured blue. [Continue>]". Different such methods could be applied but a specific method ("Method 2") is chosen as indicated by the arrow in the field 77 on page 75. The page 75 furthermore comprises the picture 73 recorded by the at least one camera 65 with the picture of the object 74 as recorded by the camera. Furthermore, a second picture field 78 ("Segmented picture") is shown on page 75 containing a segmented version 79 of the object. Segmentation methods used in the invention could be based on blob-detection algorithms known from various image processing applications, according to which "blobs" in an image, i.e. areas whose luminosity is above or below a particular value, for instance the value of the adjacent portions of the image, are identified. A segmented picture of the object 74, i.e. a picture of the object after image processing can be shown on the second picture field 78, in FIG. 19 indicated by reference numeral 79. According to the invention, segmentation can take place by clicking on a point (pixel) on the unprocessed image 74' of the object 74, i.e. the object which must be recognised by the robot system or alternatively on the surrounding portions 81 of the picture 73. The object could for instance be a brown piece of chocolate and the surroundings a conveyor belt of a different colour. Clicking on the picture 74' of the object 74 results in the display of a processed version 79 of the object. If the user decides that the processing has not been able to identify (distinguish the object sufficiently well from the surroundings), the user may click on another point (pixel) of the unprocessed picture 74 of the object and thereby attain a more satisfactory segmentation of the object. Various other parameters of the segmentation process may also be adjusted from the user interface. After successful segmentation, the algorithm running the image processing can store information relating to the shape of the picture of the object and use this information for later recognition of objects by the robot control system.

Figure 20:
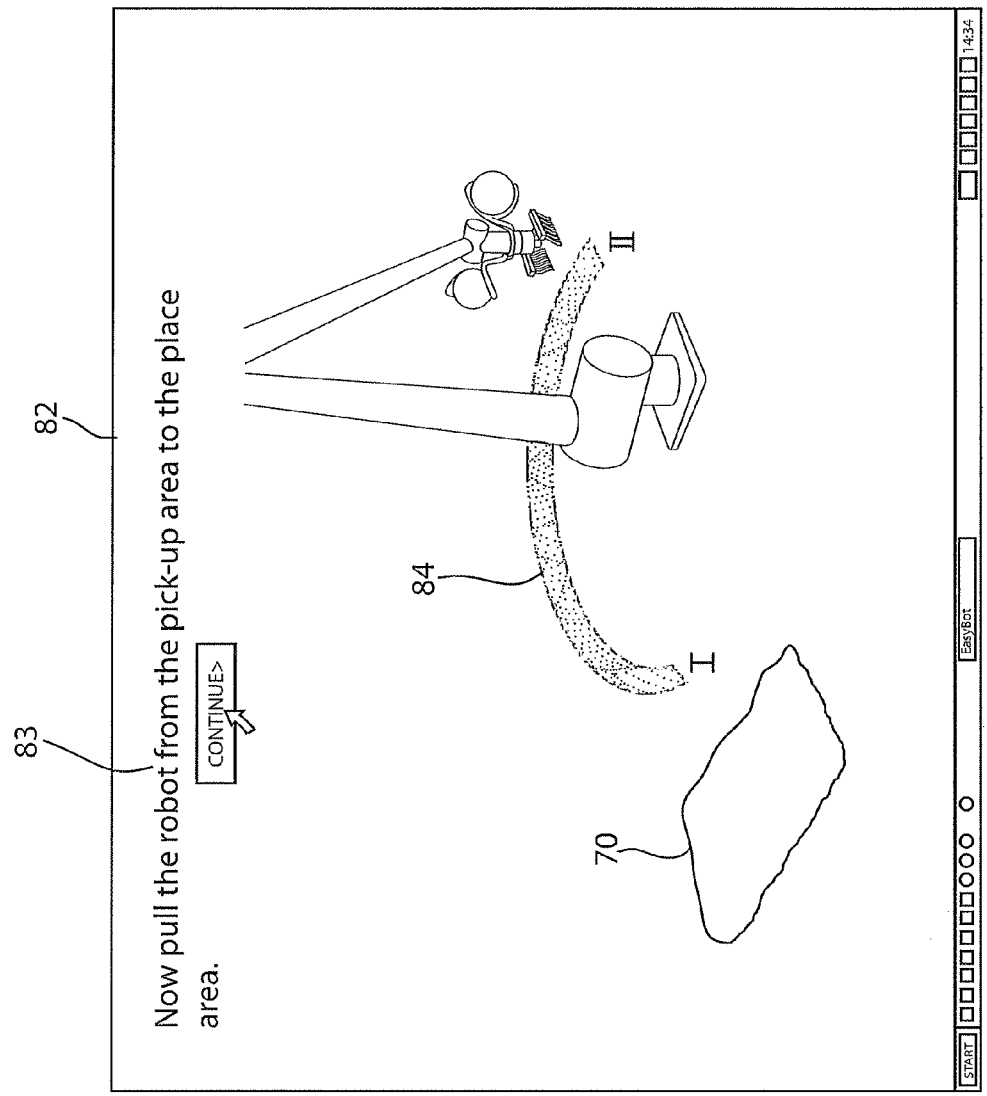

Referring to FIG. 20 there is shown the page 82 corresponding to the next step in the programming operation, i.e. the step of specifying the movement of the tool in space from the initial pick-up point (I) to the final (placement) point (II). As indicated by reference numeral 83 (in translation: "Now pull the robot from the pick-up area to the place area. [Continue>]", the user is now instructed to lead the physical robot (tool) through the desired path 84 in space and this path can either be recorded and stored in its entirety in the control system of the robot or a number of specific waypoints along the path can alternatively be recorded and stored.

Figure 21:
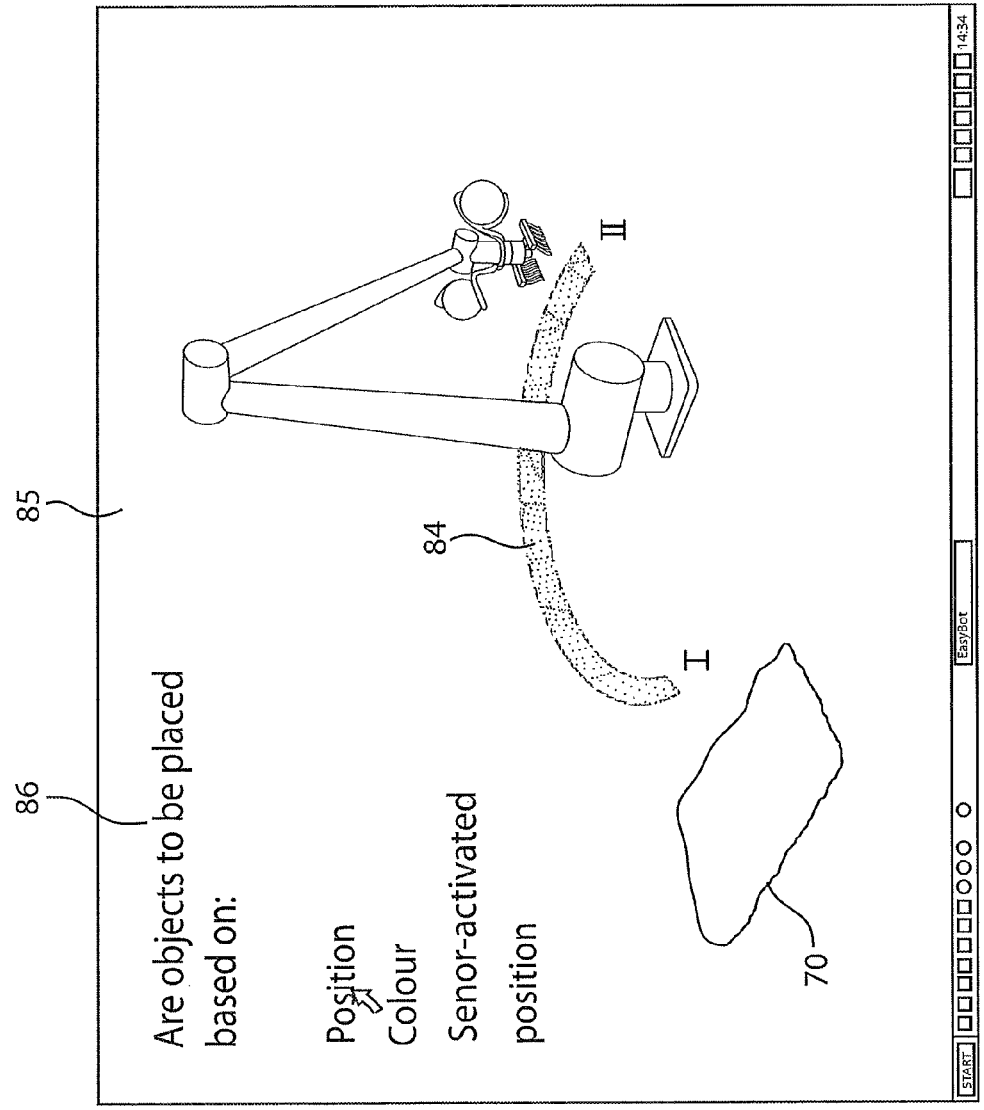

Referring to FIG. 21 there is shown the page 85 corresponding to the placement operation in the pick-and-place operation. As indicated by reference numeral 86 (in translation: "Must the object be placed based on: Position; Colour; Sensor activated position", the user is asked to indicate whether the objects are to be placed based on position, colour or a sensor-activated position. In the example shown, the position option is chosen as indicated by the arrow.

Figure 22:
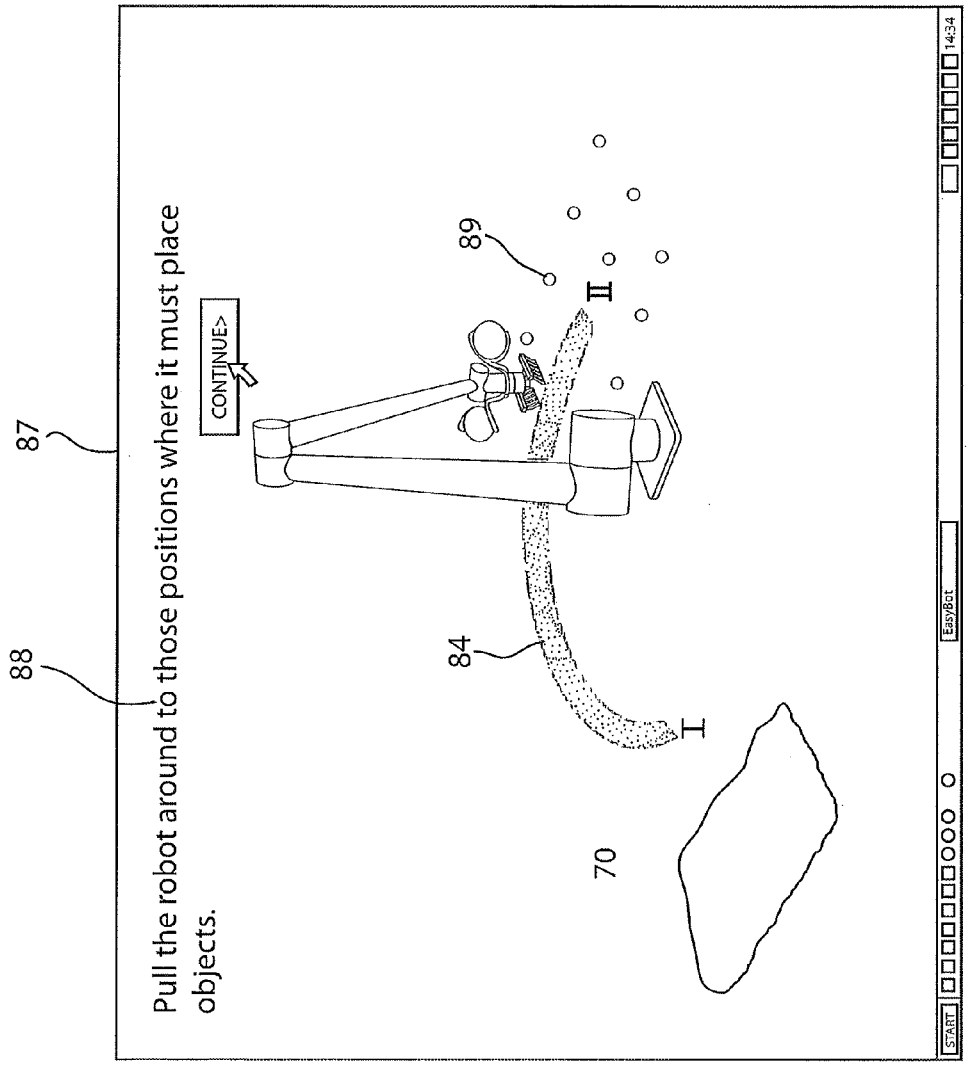

Referring to FIG. 22 there is shown the page 87 used for user specification of the positions 89, at which objects are to be placed during the placement operation. As indicated by reference numeral 88 (in translation: "Pull the robot around to those positions where it must place objects" [Continue>]), the user is instructed to lead the robot (tool) to those positions 89, where objects are to be placed. At each of these positions, the co-ordinates of the position are loaded into the control system of the robot. Alternative procedures for indicating the placement positions to the control system of the robot could also be used. Thus, for instance the "pallet" option mentioned previously according to which corners, number of rows and columns or a pattern of positions are specified could be used as an alternative.

Figure 23:
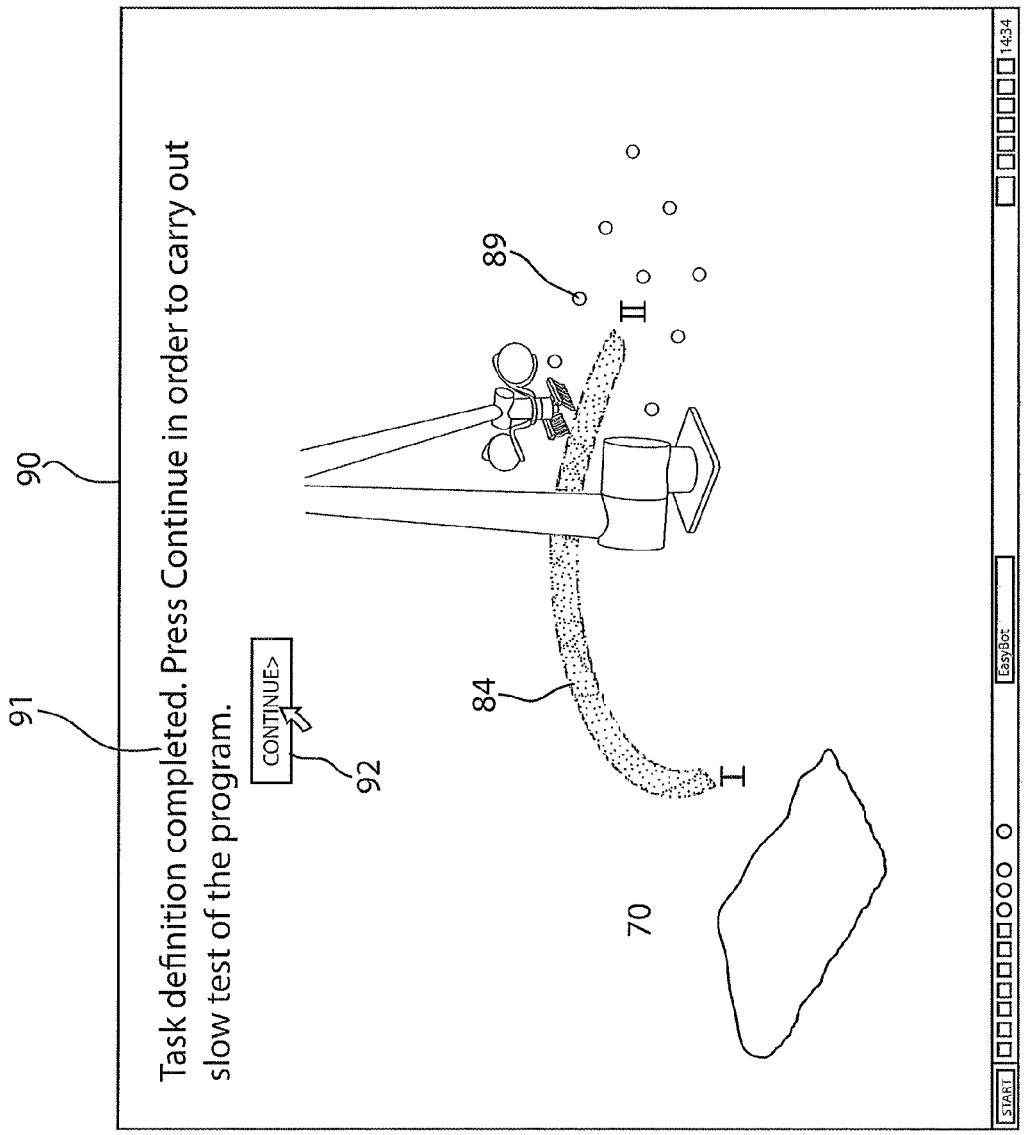

Referring to FIG. 23 there is shown the last page 90 of the programming wizard according to this embodiment of the invention. As indicated by reference numeral 91 (in translation: "Task definition completed. Press continue in order to carry out slow test of the program [Continue>]), the programming of the robot is finished and a slow control and supervision operation of the robot can be performed by pressing icon 92 on page 90.

According to the invention programming of the robot is facilitated by a number of features of the user interface and/or control system of the robot. Thus according to a specific embodiment of the invention, the user interface comprises 3D graphical display means for showing a graphical 3D representation of the robot and optionally also its surroundings. The 3D representation of the robot moves during programming and optionally also during actual operation of the robot on the display, which greatly facilitates programming of the robot, also taking the risk of collision of robot parts with the surroundings into account. Furthermore, programming of the robot is greatly facilitated by the use of wizards as already described and these wizards can according to the invention comprise stored templates corresponding to specific operations, which templates can be pre-programmed in the control system or user interface of the robot. Thus, a person skilled in the art of robot programming can create and store templates in the robot system or interface according to the invention with the effect that a user, lacking routine in robot programming, can program the robot to carry out even quite complicated tasks, without the user being forced to make more choices during programming of the robot than absolutely necessary. This makes programming quicker and easier and shortens the time needed for an inexperienced user to familiarise himself with and actually carry out the programming of the robot.

At any step during programming (and optionally during a subsequent show test run of the program on the robot and/or during actual operation of the robot), the user has a choice between a 3D representation of the robot on the display of the user interface (to give an overview of the operation of the robot) and the display of actual parameter values, co-ordinates etc. at a given instance of the operation. As mentioned, a 3D representation may also comprise the surroundings of the robot. The ability according to the invention to shift between 3D representations of the robot and surroundings and sets of actual parameter values, co-ordinates, etc. greatly facilitates programming and optimisation of the movement of the robot, which—possibly together with the above-mentioned pre-programmed templates—makes programming and operation of the robot according to the invention very easy even for an inexperienced person.

As mentioned, the robot itself may also by use of the above mentioned encoding and controlling means 24 in the joints of the robot and/or additional sensors provided on the robot be used for programming the robot, i.e. for specifying the path of movement in space of the tool mounted on the robot and/or other parts of the robot, without the necessity to calibrate the system, as the robot uses the same sensors, encoders, etc. to indicate the position, the user wishes to define and to actually bring the robot to the desired position. Using the robot itself (via the sensors, encoders, etc.), also objects in the surroundings, such as objects to be picked up or obstacles to be avoided, can be specified with the robot. For a person not familiar with robot control via an interface this may be an intuitively preferred way of programming the robot. The execution of the program attained and stored in this manner may afterwards be monitored on the display on the user interface and modified if required. Thus, a first, rough programming of the robot can be performed using the robot itself followed by a finer, detailed adjustment of the programming, which may result in a faster and even more optimal programming of the robot, in particular when programming is performed by an inexperienced user.

Figure 24:
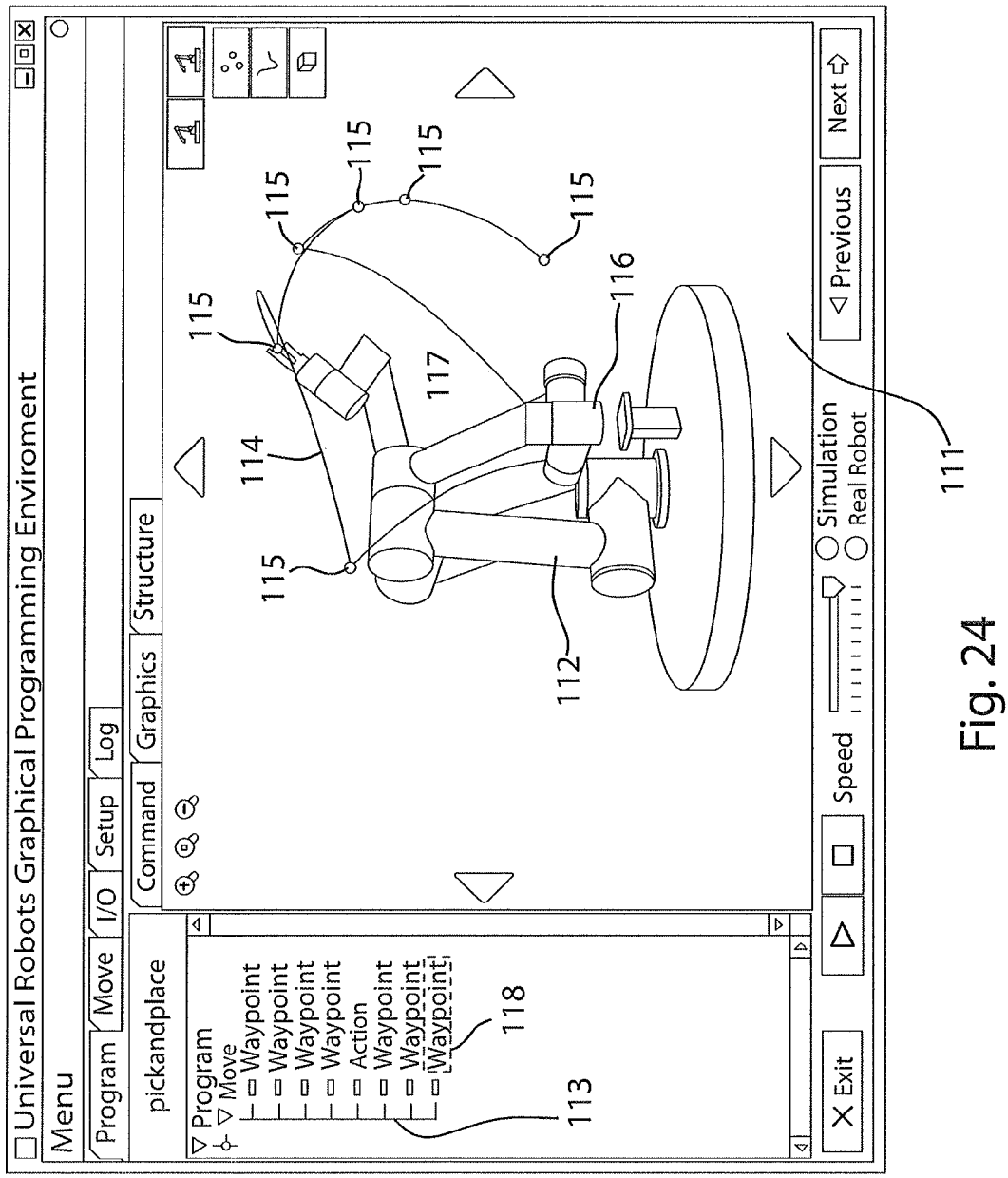
FIG. 24 shows a further embodiment of a screen image of a user interface according to the invention.

Referring to FIG. 24 there is shown a further embodiment of a screen image of a user interface according to the invention. The image shows both a 3D graphical representation 111 of a robot 112 according to an embodiment of the invention and a list of program steps 113 corresponding to a virtual or actual operation (movement through waypoints and actions to be performed at different steps during the execution of the program) of the robot. On the 3D representation there is shown the path of movement 114 of the outermost portion/tool 116 of the robot 112 through a sequence of waypoints 115 (a total of seven waypoints are mentioned in the list of program steps 113, one of these being hidden behind the robot in the graphical representation). The step "action" in the list of steps 113 triggers a specific action of the tool that is carried out when the tool arrives at a specific waypoint (for instance that a voltage is applied to one of the digital output channels of the robot system, which causes the activation of a spray nozzle on the tool, spraying for instance paint on an object. In this manner it is possible to indicate the point on the path of movement 114 at which spraying is to begin). The shadow image 117 of the robot corresponds to the waypoint indicated by 118 in FIG. 24. The shadow image of the robot indicates the virtual movement of the robot and the virtual position of the robot at the different waypoints, thereby giving the user an indication of how the different parts (joints, arm sections and tool) of the real robot will be located in real space, when the tool is positioned in a specific waypoint. If, for instance, a 3D graphical representation of obstacles or prohibited regions in the surroundings of the robot is also incorporated on the screen image, a user may for instance decide whether there is a risk of collision of portions of the robot with objects in the surroundings and whether modifications of the path of movement of different portions of the robot may be required in order to ascertain that no collisions occur during real operation of the robot.

Figure 25:
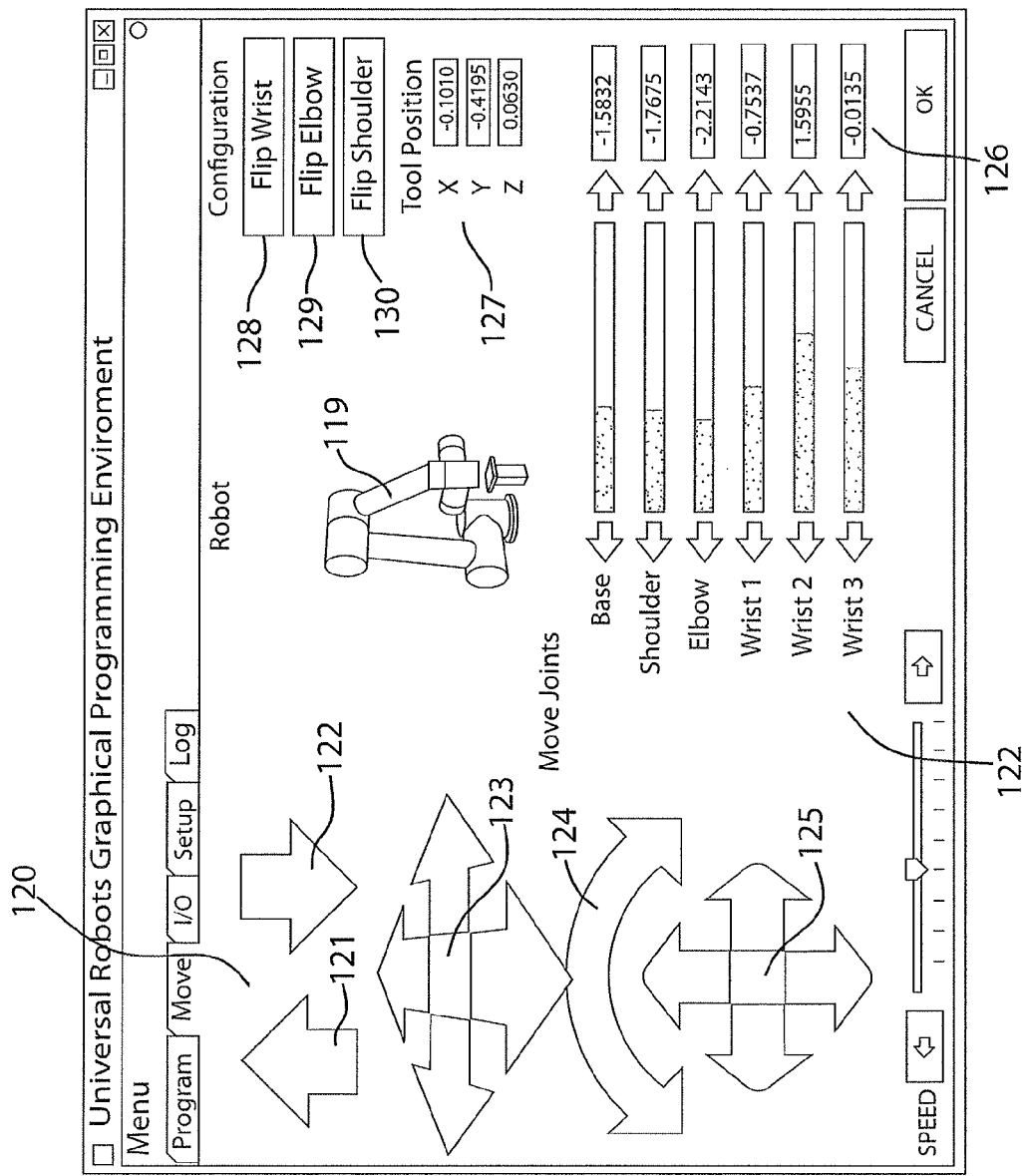
FIG. 25 shows a still further embodiment of a screen image of a user interface according to the invention.

Referring to FIG. 25 there is shown another screen image on the user interface according to the invention comprising a 3D representation 119 of the robot, a field 120 specifying movements of the tool (different movements of the tool being accomplished by pressing the icons 121, 122, 123, 124 and 125). Using the arrow icons it is possible for the user to change the position and/or the orientation of the tool (in a manner somewhat resembling that, which is described in connection with FIG. 11(a) above). According to the shown embodiment, the manipulations of the tool by means of icons 121 to 125 take place in relation to the same point of view as the 3D representation indicated by reference numeral 119 in FIG. 25.

Furthermore, the screen image comprises a field 122 ("Move joints"), by means of which the user may move (rotate) each specific joint separately instead of moving the tool (field 120), where movement of the tool normally results in more than one joint moving (rotating) simultaneously. Using the "Move joints" facility can be useful for instance in those cases, where it is apparent for the user that the desired position of the tool can be attained by simply controlling a single joint. The numerical values 126 could indicate the relative rotation of each specific joint or the relative rotation of the base joint (in radians or degrees), but other indications could be used and are at any rate not of prime importance for an average used. The indications may be omitted altogether, if desired. The position of the tool in XYZ-coordinates is indicated at 127. Icons referred to by 128, 129 and 130 enable a choice of different configuration spaces. In practice the robot can arrive at one and the same position and orientation (pose) of the tool in a number of different manners. The robot according to this embodiment of the invention have eight different manners in which a given pose of the toll can be attained. Thus for instance the elbow portion of the robot may face either upwards or downwards. The shoulder portion may also be turned 180 degrees and the wrist may also be turned such that the "hand" faces the base of the robot.

Figure 26:
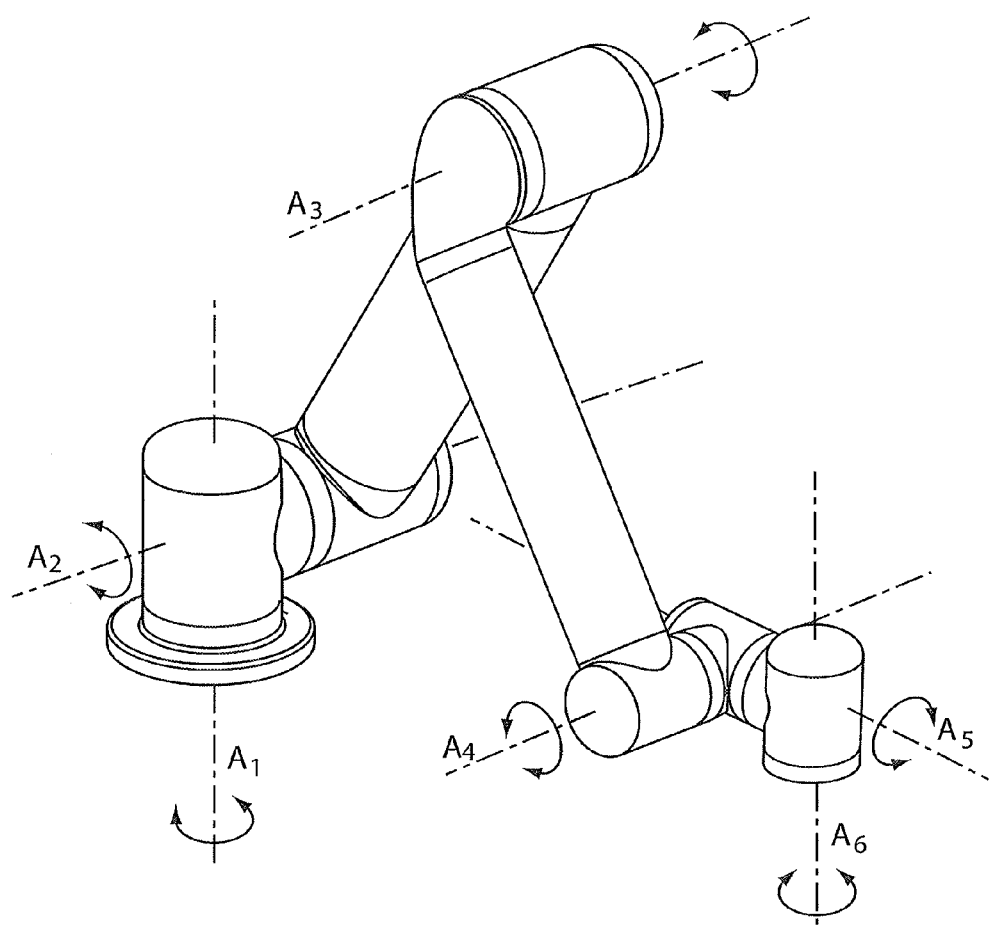
FIG. 26 shows a first embodiment of a six-axis robot according to the invention.
Figure 27:
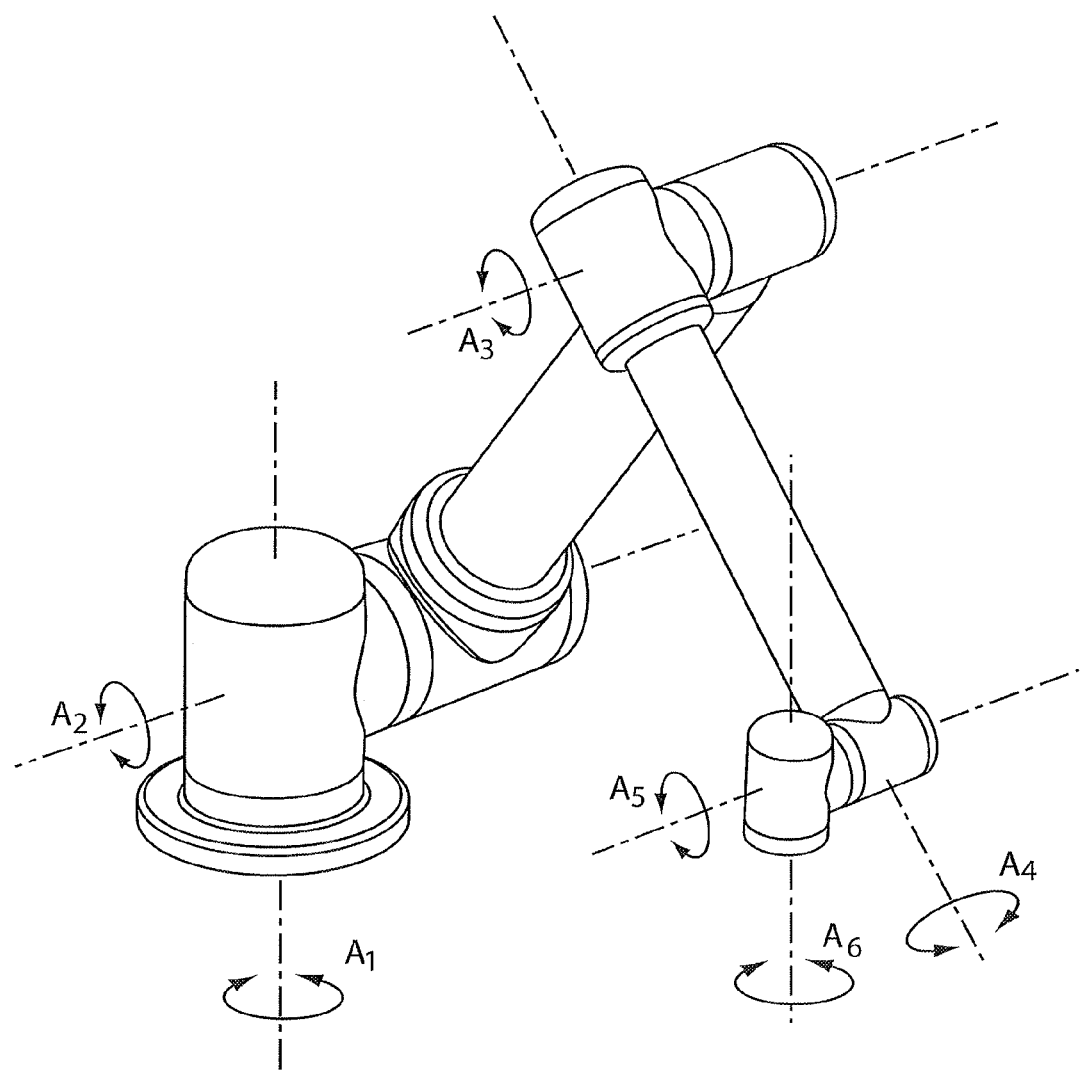
FIG. 27 shows a second embodiment of a six-axis robot according to the invention.

With reference to FIGS. 26 and 27 there are shown two embodiments of a six-axis robot according to the invention. The cinematic construction of this robot is chosen such that the following characteristics are obtained:
(1) The construction of each joint is as simple as possible.
(2) The robot comprises a minimum of different types of joints.
(3) The members connecting each joints are light-weight, rigid and as inexpensive as possible.
(4) The design of the robot ensures a ration between the payload and the weight of the robot itself of at least ⅓.

In order to make each robot joints as simple as possible, each joint has only one degree of freedom—rotation about an axis through the joint—and the connections of the joint with the connecting members are provided at an angle of 90 degrees relative to each other.

Referring to FIG. 26 there is shown a first embodiment of a six-axis robot according to the invention having the above characteristics. The robot comprises the axes A1 through A6. This robot has the cinematic structure: Roll-Pitch-Pitch-Pitch-Roll-Yaw and comprises only two types of joints, three of each type, two types of connecting members in the form of tubes with thin walls, one angle member and one foot member.

With reference to FIG. 27 there is shown a second embodiment of a six-axis robot according to the invention having the above characteristics. The robot comprises the axes A1 through A6. This robot has the following cinematic structure: Roll-Pitch-Pitch-Roll-Pitch-Roll and comprises three types of joints, two of each type, two types of connecting members in the form of tubes with thin walls, each comprising a corresponding adapter flange and a foot member.

Figure 28:
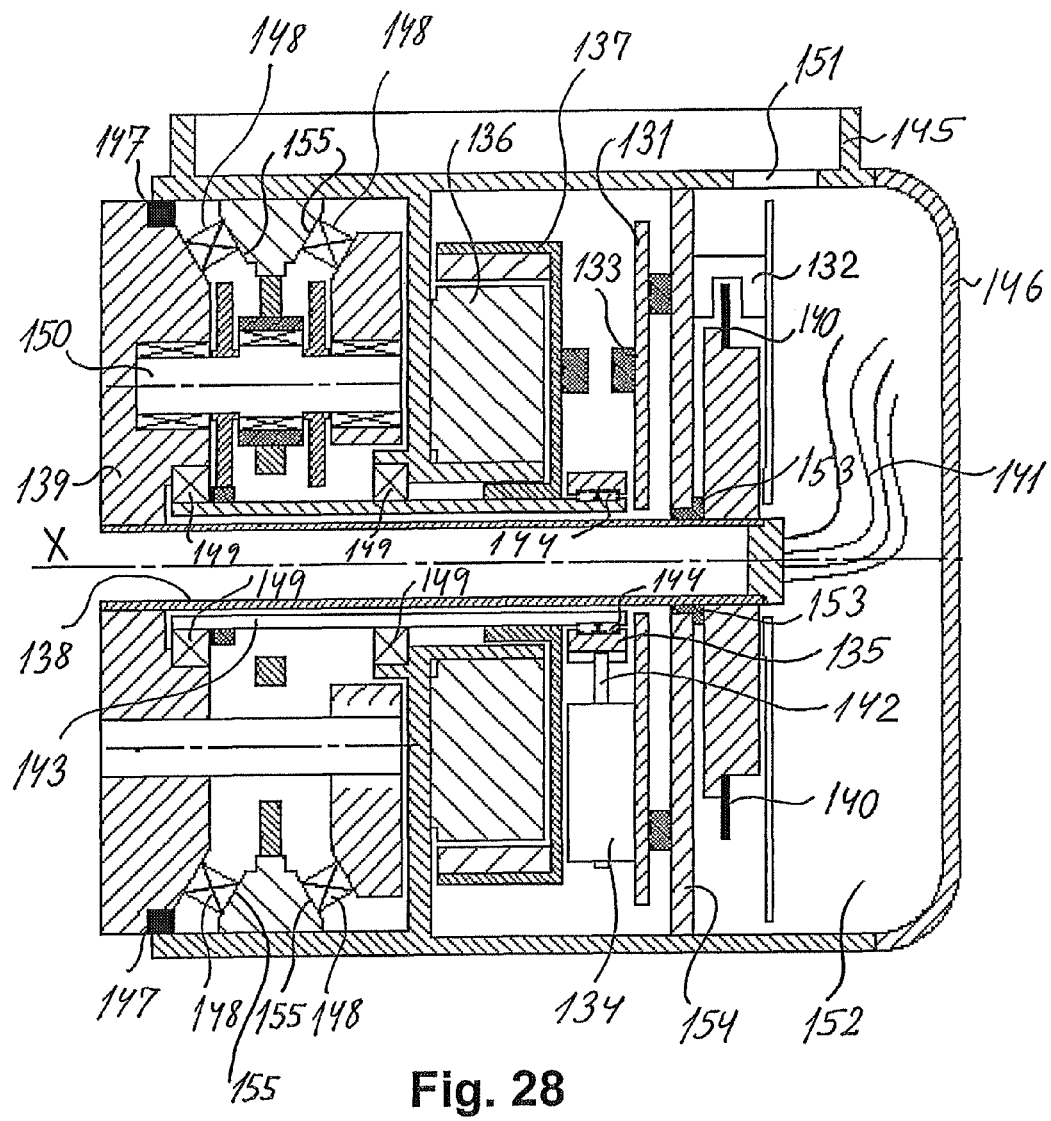
FIG. 28 shows a cross sectional view through a robot joint according to an embodiment of the invention.

With reference to FIG. 28 there is shown a cross sectional view through a joint according to an embodiment of the invention. The joint comprises mechanical, electro-mechanical, electronic and optical elements that are mutually interconnected, either directly via electrical connectors or via wireless, for instance optical, coupling to other elements. In order to ensure the most simple and straightforward mounting and connection of these elements it is advantageous if as many as possible of these elements are provided on one printed circuit board 131 (PCB). A cross sectional view through an embodiment of a joint, which can be used in the six-axis robots shown in FIGS. 26 and 27 is shown in FIG. 28, but it is understood that this joint could also be used in connection with other robots.

In the shown embodiment, optical encoders 132, 133 are used and a safety brake 134, 135 is implemented using a very small solenoid 134. The brake is designed such that the solenoid 134 can activate and deactivate the brake with a very limited force.

The encoder 133 used for determining the position (angular orientation of the axle/rotor) of the motor (angular orientation) is mounted at the rear surface of the PCB 131. The motor shown in FIG. 28 comprises a stator part 136 and a rotor part 137.

The encoder 132 used for determining the angular orientation of the output axle 138 or output flange 139 of the joint is mounted on the front surface of the PCB or in a socket on the front surface of the PCB 131. Preferably a high resolution encoder is used and the short distance between the hollow axle 138 and the encoder is important in order to attain a proper positioning of sensor and encoder disc relative to each other. In order to be able to sense the movement (rotation) of the output flange 139 at the PCB 131 through the joint the encoder disc 140 is mounted on the hollow axle 138 through which electrical and pneumatically connections 141 are guided through the joint and the hollow axle 138 is connected to the output flange 139.

The safety brake 134, 135, which stops the robot 137 for instance at power drop-out, is formed as an integral part with the PCB 131. The solenoid 134, which in the event of power drop-out displaces a ratchet 142 into engagement with an annular member 135 mounted on the motor axle 143, is mounted directly on the PCB 131. This annular member 135 (friction ring) can rotate relative to the motor axle, but there is a high friction between the annular member and the motor axle 143. This ensures a controlled halt of the joint but without halting the joint so abruptly that the robot arm becomes overloaded. In the figure, friction between the annular member 135 and the motor axle 143 is ensured by O-rings 144 tightly fitted between the motor axle 143 and the annular member 135 (friction ring).

Furthermore, the joint according to this embodiment of the invention is designed such that adjacent joints can be attached to each other without use of further elements. Attachment of the joint to an adjacent joint or connecting member (for instance a thin-walled tube) takes place via the output flange 139 and the connecting portion 145 on the housing 146 of the joint. Apart from this, robot joints according to the invention can be coupled together by suitable members, for instance thin-walled tubes, which constitutes a preferred choice due to their optimal rigidity/weight ratio. Furthermore, the joint according to this embodiment of the invention comprises a seal 147 between the housing 146 and the output flange 139, main bearings 148 resting against inclined inner surface portions (bearing surfaces) 155 provided in the housing 146, sealed bearings 149, transmission 150, at least one passage 151 for connections from an adjacent joint or connecting member, an area/space (152) for a slip ring and for twisting wires 141, when the output members 138, 139 rotate, further bearings 153 and a plate 154, for instance of aluminium or other suitable material, for mounting the PCB 131 and also for acting as a heat sink for power electronics in the joint.

Instead of a pair of thrust angular-contact needle bearings shown in the figure as the main bearing arrangement in the joint, a single four point of contact ball bearing or a single crossed roller bearing or a pair of angular contact ball bearings could be used.

Furthermore, instead of the shown eccentric gear arrangement with a single eccentric pinion, an eccentric gear arrangement with 2 pinions, phaseshifted 180 degrees, or 3 pinions, phase shifted 120 degrees could be used. Alternatively, a harmonic drive gear can be used in the unit, either with or without an integrated output bearing.

Although a number of specific embodiments have been shown and described above, it is understood that the present invention, both the robot itself, the user interface means used for programming and controlling the robot and the entire control system as such may be implemented in a number of different ways. Thus, for instance numerous alternative menu pages on the user interface may be designed. The scope of the invention is thus defined by the appended claims including technical equivalents of these. It is furthermore understood that the user interface means of the invention may also be used in connection with other robots than those shown, described and claimed in the present application and that this also applies to the electro-mechanical elements of the robot, such as the joints with drive means, encoders, etc.

The invention claimed is:

1. A programmable robot system comprising:
    (a) a robot comprising a number of individual arm sections, where adjacent arm sections are interconnected by a joint;
    (b) a controllable drive provided in at least some of said joints which drives said joints;
    (c) a control system for controlling each said controllable drive;
    (d) a user interface system comprising programming for the control system, said user interface system being provided externally to the robot as a remote control; and
    (e) a storage co-operating with said user interface system and said control system for storing information related to one of the movement and further operations of the robot or of a robot tool mounted on the robot; and
    wherein said remote control further comprises a touch screen upon which a 3D-representation of the robot is shown together with icons for positioning and orienting the robot or robot tool; and
    wherein positioning and orienting movements of the robot directed by a user with the icons on the touch screen of the remote control result in physical positioning and orienting changes to the robot which are shown by the 3D-representation of the robot on the touch screen.

2. A programmable robot system according to claim 1, wherein said control system comprises a trigger for controlling triggering of actions performed by one of the robot or the tool mounted on the robot; and
    wherein said trigger for triggering comprises a sensor which is placed on one of an external portion of the robot or an external element in the surroundings of the robot.

3. A programmable robot system according to claim 1, characterized in that the programming of the remote control comprises software applications containing one or more wizards that can be chosen by a user for aid during programming of the robot.

4. A programmable robot system according to claim 1, characterized in that the remote control, at least during programming of the robot with said programming, has access to pre-programmed templates describing preferred movements, actions and other characteristics relevant to the robot in relation to one of specific operations or surroundings.

5. A programmable robot system according to claim 1, characterized in that said remote control comprises:
    (a) an external programming and control unit which is provided with the touch screen which touch screen displays one of menus or computer-generated pictures of the robot at least during programming and an initial control/supervision of the robot, and where the touch screen includes a mechanism for entering directions and information to the control system of the robot; and
    (b) one of an external sensor or an entry mechanism, said external sensor being for one of a) placement on chosen portions of the robot, or b) placement remote from said programming and control unit, and said entry mechanism being for tracing paths in space which will be followed by portions of the robot during programming and operation of the robot.

6. A programmable robot system according to claim 5, characterized in that said entry mechanism comprises a 3D-mouse ("space mouse") or a joystick.

7. A programmable robot system according to claim 1, characterized in that computer-generated images of pertinent parts of the surroundings of the robot are displayed on the touch screen.

8. A programmable robot system according to claim 1, wherein said icons for positioning and orienting the tool comprise a) icons for setting the co-ordinates of roll, pitch and yaw of the robot tool and b) icons for positioning the robot tool vertically and horizontally, and wherein said touch screen furthermore displays icons for rotating the respective joints of the robot.

9. A programmable robot system according to claim 1, wherein said joint comprises a safety brake comprising a solenoid, which upon activation of the brake displaces a ratchet into engagement with an annular member mounted on the motor axle, whereby the annular member can rotate relative to the motor axle, but with friction between the annular member and the motor axle; and wherein said solenoid is mounted on a printed circuit board (PCB) that is fixed relative to the housing of the joint.

10. A programmable robot system according to claim 1, wherein the 3D-representation of the robot on the touch screen also shows actual movements of the robot during actual operation of the robot.

11. A remote control for a programmable robot which is external to the programmable robot comprising:
a control system of the programmable robot; and
a touch screen which
 (a) shows menus relating to programming steps to be performed by a user during programming of the programmable robot together with icons for positioning and orienting a robot tool of the programmable robot,
 (b) shows a computer generated representation of the programmable robot, wherein said computer generated representation is a 3 dimensional representation of the robot showing actual movements of the robot at least during programming of the robot, and
 (c) enters instructions to the control system for positioning and orienting movements of the robot which result in physical positioning and orienting changes to the robot which are shown by the 3D-representation of the robot on the touch screen.

12. A remote control according to claim 11, further comprising storage for storing information relating to programming and operations of the robot and also for storing information relating to the surroundings of the robot.

13. A remote control according to claim 11, wherein said control system is for controlling said position and movement of the tool including indicating one of the position or orientation of the tool at a number of positions in space and storing said position or orientation in a storage in the control system, where at least one of said positions or orientations of the tool is in the vicinity of an object to be handled by the tool.

14. A remote control according to claim 13, wherein the control system further senses or identifies said object at said at least one position of the tool.

15. A remote control according to claim 11, wherein said icons for positioning and orienting the tool comprises a) icons for setting the co-ordinates roll, pitch and yaw of the robot tool and b) icons for positioning the robot tool vertically and horizontally, and wherein said touch screen furthermore displays icons for rotating the respective joints of the robot.

16. A remote control according to claim 11, wherein the 3 dimensional representation of the robot on the touch screen also shows actual movements of the robot during actual operation of the robot.

* * * * *

UNITED STATES PATENT AND TRADEMARK OFFICE
CERTIFICATE OF CORRECTION

| | | |
|---|---|---|
| PATENT NO. | : 8,779,715 B2 | Page 1 of 1 |
| APPLICATION NO. | : 12/281528 | |
| DATED | : July 15, 2014 | |
| INVENTOR(S) | : Kassow et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1067 days.

Signed and Sealed this
Fifth Day of April, 2016

Michelle K. Lee
*Director of the United States Patent and Trademark Office*